(12) United States Patent
Lee et al.

(10) Patent No.: US 10,084,793 B2
(45) Date of Patent: Sep. 25, 2018

(54) ELECTRONIC DEVICE FOR MANAGING USE OF DATA FROM OTHER ELECTRONIC DEVICE AND METHOD FOR CONTROLLING THE SAME

(71) Applicant: Samsung Electronics Co., Ltd., Suwon-si, Gyeonggi-do (KR)

(72) Inventors: Choong-Hoon Lee, Yongin-si (KR); Woo-Chul Shim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 14/930,875

(22) Filed: Nov. 3, 2015

(65) Prior Publication Data

US 2016/0148011 A1    May 26, 2016

(30) Foreign Application Priority Data

Nov. 26, 2014  (KR) .................. 10-2014-0166471

(51) Int. Cl.
| | | |
|---|---|---|
| H04L 29/06 | (2006.01) | |
| H04L 29/08 | (2006.01) | |
| G06F 21/62 | (2013.01) | |
| H04L 12/64 | (2006.01) | |
| G06F 21/44 | (2013.01) | |

(52) U.S. Cl.
CPC ............ *H04L 63/102* (2013.01); *G06F 21/44* (2013.01); *G06F 21/629* (2013.01); *H04L 12/6418* (2013.01); *H04L 67/06* (2013.01); *G06F 2221/2113* (2013.01)

(58) Field of Classification Search
CPC ..... H04L 63/10; H04L 63/101; H04L 63/102; H04L 63/105; G06F 21/6218; G06F 21/629
USPC .................... 726/22–24, 26–30; 713/193
See application file for complete search history.

(56) References Cited

U.S. PATENT DOCUMENTS

| | | | | |
|---|---|---|---|---|
| 7,131,000 | B2 * | 10/2006 | Bradee ................ | G06F 21/6218 707/999.009 |
| 7,596,227 | B2 * | 9/2009 | Illowsky ............... | G06F 1/3203 380/277 |
| 7,743,407 | B2 | 6/2010 | Sprigg et al. | |
| 7,774,830 | B2 * | 8/2010 | Dillaway ............ | G06F 21/6218 713/172 |
| 7,877,693 | B2 * | 1/2011 | Baek ....................... | H04L 63/10 715/744 |
| 8,001,375 | B2 * | 8/2011 | Hattori ................ | G06F 12/1458 713/165 |
| 8,490,183 | B2 * | 7/2013 | Kondo .................... | G06F 21/51 455/436 |
| 8,533,746 | B2 | 9/2013 | Nolan et al. | |
| 8,539,228 | B1 * | 9/2013 | Mason .................... | H04L 9/088 713/164 |
| 2008/0101597 | A1 | 5/2008 | Nolan et al. | |
| 2009/0249448 | A1 | 10/2009 | Choi et al. | |
| 2013/0198392 | A1 | 8/2013 | Hymel et al. | |

(Continued)

*Primary Examiner* — Hosuk Song
(74) *Attorney, Agent, or Firm* — Jefferson IP Law, LLP

(57) ABSTRACT

A method for controlling a first electronic device communicating with a second electronic device is provided. The method includes connecting to the second electronic device, receiving a request to use data stored in the second electronic device from a first application, determining whether to permit to use the data, and, if permitted to use the data, controlling the first application to use the data.

20 Claims, 26 Drawing Sheets

(56) References Cited

U.S. PATENT DOCUMENTS

2014/0189880 A1 7/2014 Funk
2014/0344896 A1 11/2014 Pak et al.

* cited by examiner

ELECTRONIC DEVICE FOR MANAGING USE OF DATA FROM OTHER ELECTRONIC DEVICE AND METHOD FOR CONTROLLING THE SAME

CROSS-REFERENCE TO RELATED APPLICATION(S)

This application claims the benefit under 35 U.S.C. § 119(a) of a Korean patent application filed on Nov. 26, 2014 in the Korean Intellectual Property Office and assigned Serial number 10-2014-0166471, the entire disclosure of which is hereby incorporated by reference.

TECHNICAL FIELD

The present disclosure relates to electronic devices for managing use of data from other electronic devices and methods for controlling the same.

BACKGROUND

Recently, Internet of things (IoT)-related technologies are in development. The IoT is for an Internet connection between things, and all things may be assigned Internet protocol (IP) addresses. For example, IP addresses may be given to a proximity sensor and an illumination system in a home, and the proximity sensor and illumination system may communicate with each other using their IP addresses. Accordingly, when the user moves from a first position to a second position in the home, the proximity sensor installed at the second position may sense the user's movement to the second position. The proximity sensor may transmit information of the user's movement to the illumination system, and the illumination system may turn on a light at the second position while turning off a light at the first position. As such, as multiple electronic devices may communicate with one another.

However, as multiple electronic devices may communicate with one another, security is an issue. In particular, wearable electronic devices contain personal information related to the user's body targeted. Thus, a need exists for data management methods for increased security between such electronic devices.

The above information is presented as background information only to assist with an understanding of the present disclosure. No determination has been made, and no assertion is made, as to whether any of the above may be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and control methods thereof to address the foregoing or other issues.

In accordance with an aspect of the present disclosure, a method for controlling a first electronic device communicating with a second electronic device is provided. The method includes connecting to the second electronic device, receiving a request to use data stored in the second electronic device from a first application, determining whether to permit to use the data, and, if permitted to use the data, controlling the first application to use the data.

In accordance with another aspect of the present disclosure, a first electronic device communicating with a second electronic device is provided. The first electronic device includes a communication unit configured to connect to the second electronic device and configured to receive a request to use data stored in the second electronic device from a first application, determine whether to permit to use the data, and, if permitted to use the data, control the first application to use the data.

In accordance with another aspect of the present disclosure, a method for controlling a first electronic device communicating with a second electronic device is provided. The method includes, when installing a first application, identifying a type of first data used by the first application, identifying a type of second data stored by the second electronic device, and when the type of the first data is the same as the type of the second data, determining whether to assign the first application access to use the second electronic device.

In accordance with another aspect of the present disclosure, a method for controlling a first electronic device communicating with a second electronic device is provided. The method includes connecting to the second electronic device, identifying data output by the second electronic device, determining a first application stored in the first electronic device corresponding to a type of the data, and determining whether to permit the first application to use the data.

In accordance with another aspect of the present disclosure, a method for controlling a first electronic device is provided. The method includes connecting to a second electronic device and connecting to a third electronic device via the second electronic device, receiving a request from a first application to use data stored in the third electronic device, and determining whether to permit to use the data.

In accordance with another aspect of the present disclosure, a method for controlling a first electronic device communicating with a second electronic device is provided. The method includes connecting to the second electronic device, receiving a request from a first application to access a resource of the second electronic device, determining whether to access the resource of the second electronic device, and, based on the determination, accessing the resource of the second electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
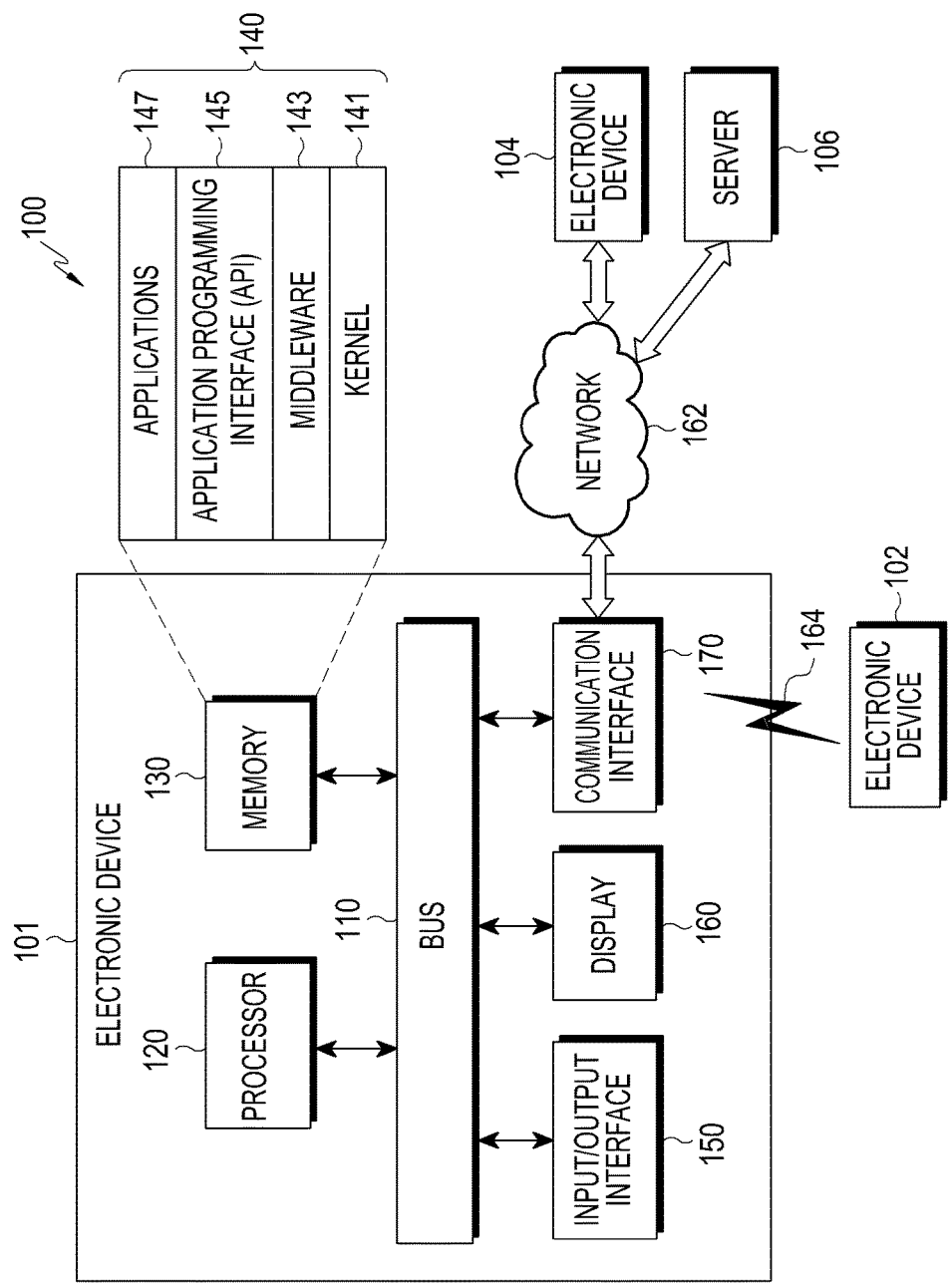
FIG. 1A illustrates a system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or an application processor (AP)) that may perform the operations by executing one or more software programs stored in a memory device or a dedicated processor (e.g., an embedded processor) for performing the operations.

The terms as used herein are provided merely to describe various embodiments thereof, but not to limit the scope of other embodiments of the present disclosure. All terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television (TV), a digital versatile disc (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things devices (e.g., a bulb, various sensors, an electric or a gas meter, a sprinkler, a fire alarm, a thermostat, a street light, a toaster, fitness equipment, a hot water tank, a heater, or a boiler).

According to various embodiments of the present disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A illustrates a configuration of a system according to an embodiment of the present disclosure.

Referring to FIG. 1A, an electronic device 101 is included in a network environment 100. The electronic device 101 may include a bus 110, a processor 120, a memory 130, an input/output interface 150, a display 160, and a communication unit 170. In some embodiments, the electronic device 101 may exclude at least one of the components or may add another component.

The bus 110 may include a circuit for connecting the components 120 to 170 with one another and transferring communications (e.g., control messages and/or data) between the components.

The processing module 120 may include one or more of a CPU, an AP, or a communication processor (CP). The processor 120 may perform control on at least one of the other components of the electronic device 101, and/or perform an operation or data processing relating to communication. The processor 120 may be referred to as a controller, or the processor 120 may include a controller as part thereof.

The memory 130 may include a volatile and/or non-volatile memory. For example, the memory 130 may store commands or data related to at least one other component of the electronic device 101. The memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be referred to as an operating system (OS).

For example, the kernel 141 may control or manage system resources (e.g., the bus 110, processor 120, or a memory 130) used to perform operations or functions implemented in other programs (e.g., the middleware 143, API 145, or the application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 may include at least one interface or function (e.g., a command) for filing control, window control, image processing or text control.

As used herein, the term "application" may be referred to as an application program as well.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication unit 170 may set up communication between the electronic device 101 and an external device (e.g., a first electronic device 102, a second electronic device 104, or a server 106). For example, the communication unit 170 may be connected with the network 162 through wireless or wired communication to communicate with the external electronic device.

The wireless communication may use at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS). The network 162 may include at least one of a telecommunication network, e.g., a computer network (e.g., local area network (LAN) or wide area network (WAN)), Internet, or a telephone network.

The first and second external electronic devices 102 and 104 each may be of the same or a different type from the electronic device 101. The server 106 may include a group of one or more servers. All or some of operations executed on the electronic device 101 may be executed on another or multiple other electronic devices (e.g., the electronic devices 102 and 104 or server 106). The electronic device 101 may be configured to request another device (e.g., electronic devices 102 and 104 or server 106) to perform at least some functions that the electronic device 101 could perform. The other electronic device (e.g., electronic devices 102 and 104 or server 106) may execute the requested functions or additional functions and transfer a result of the execution to the electronic device 101. The electronic device 101 may provide a requested function or service by processing the received result. To that end, a cloud computing, distributed computing, or client-server computing technique may be used, for example.

The communication unit 170 may connect with the second electronic device 102. The processor 120 may receive a request for using data from the second electronic device, determine whether to permit to use the data from the second electronic device, and control the use of the data from the second electronic device by the first application based on the determination.

The display 160 may display a user graphic interface for inquiring about whether the first application uses the data from the second electronic device.

The processor 120 may determine whether to permit or reject the use of the data from the second electronic device 102 based on a user input obtained from the user graphic interface.

The processor 120 may determine the second electronic device 102 stores the type of data requested by the first application based on pre-stored association information on the second electronic device and the type of data from the second electronic device.

The processor 120 may determine whether to permit or reject the use of data from the second electronic device 102 based on a security level of the first application.

The processor 120 may determine whether to permit the use of the data from the second electronic device 102 based on pre-stored association information on the second electronic device 102 and an application security level permitted for the second electronic device 102.

The processor 120 may determine whether to permit or reject the use of data from the second electronic device 102 based on an installation source of the first application.

The communication unit 170 may inquire the second electronic device 102 about whether to permit the use of the data. The processor 120 may determine whether to permit the use of the data from the second electronic device 102 based on a response received from the second electronic device 102.

The communication unit 170 may connect to a third electronic device for communication. The processor 120 may determine a second application to use data installed in the third electronic device based on the type of the data and may determine whether to permit the use of the data in the second application.

The communication unit 170 may connect to the third electronic device through the relaying of the second electronic device. The processor 120 may receive a request for the first application to use the data from the third electronic device and may determine whether to permit the use of the data by the third electronic device.

The processor 120 may receive a request for the first application to use the data from the second electronic device 102 while installing the first application in the first electronic device 101.

The processor 120 may receive a request for the first application to use the data from the second electronic device 102 while the first application is run on the first electronic device 101.

The processor 120, when permitting to use the data, may transfer the data from the second electronic device 102 to the first application or may transfer the data from the first application to the second electronic device 102.

The processor 120 may receive a declaration regarding the type of data to be used from the first application, and upon requesting data other than the data declared by the first application, may not permit the use of the other data.

The second electronic 102 device may output data of a first type and data of a second type, and the processor 120 may receive a request to use the data of the first type.

The processor 120, when permitting to use the first type of data, may transfer the first type of data output from the second electronic device 102 to the first application and may block the access of the first application to the second type of data.

Figure 1B:
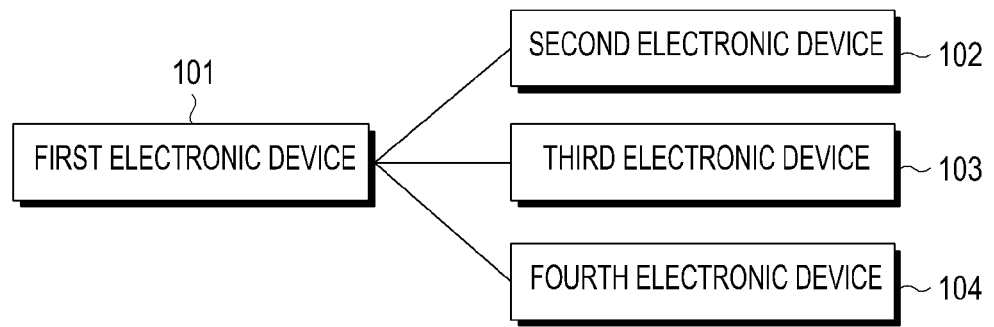
FIG. 1B is a block diagram of a system according to an embodiment of the present disclosure.

FIG. 1B is a block diagram of a system according to an embodiment of the present disclosure.

Referring to FIG. 1B, the first electronic device 101 may be connected with the second electronic device 102, the third electronic device 103, and the fourth electronic device 104.

For example, the first electronic device 101 may be connected with the second electronic device 102, the third electronic device 103, and the fourth electronic device 104 based on various communication schemes, such as Bluetooth® (BT), BT low energy (BLE), Wireless-Fidelity (Wi-Fi) direct, ZigBee®, near-field communication (NFC), infrared (IR) communication, or visible light communication. Meanwhile, the above-listed communication schemes are merely examples, and any suitable communication schemes can be used to enable data communication between electronic devices. Further, although the first electronic device 101 is directly connected with electronic devices 102, 103, and 104 without the relaying of other electronic devices, this is merely an example. At least one electronic device that may relay data communication between the first electronic device 101 and the electronic devices 102, 103, and 104. In other words, the first electronic device 101 may also be connected to electronic devices 102, 103, and 104 via the relaying of another electronic device. Accordingly, the first electronic device 101 may establish a connection with the electronic devices 102, 103, and 104 arranged in a remote site as compared with the direct connection with the electronic devices. Further, the first electronic device 101 may also be connected to electronic devices 102, 103, and 104 via a wired communication scheme.

Figure 2:
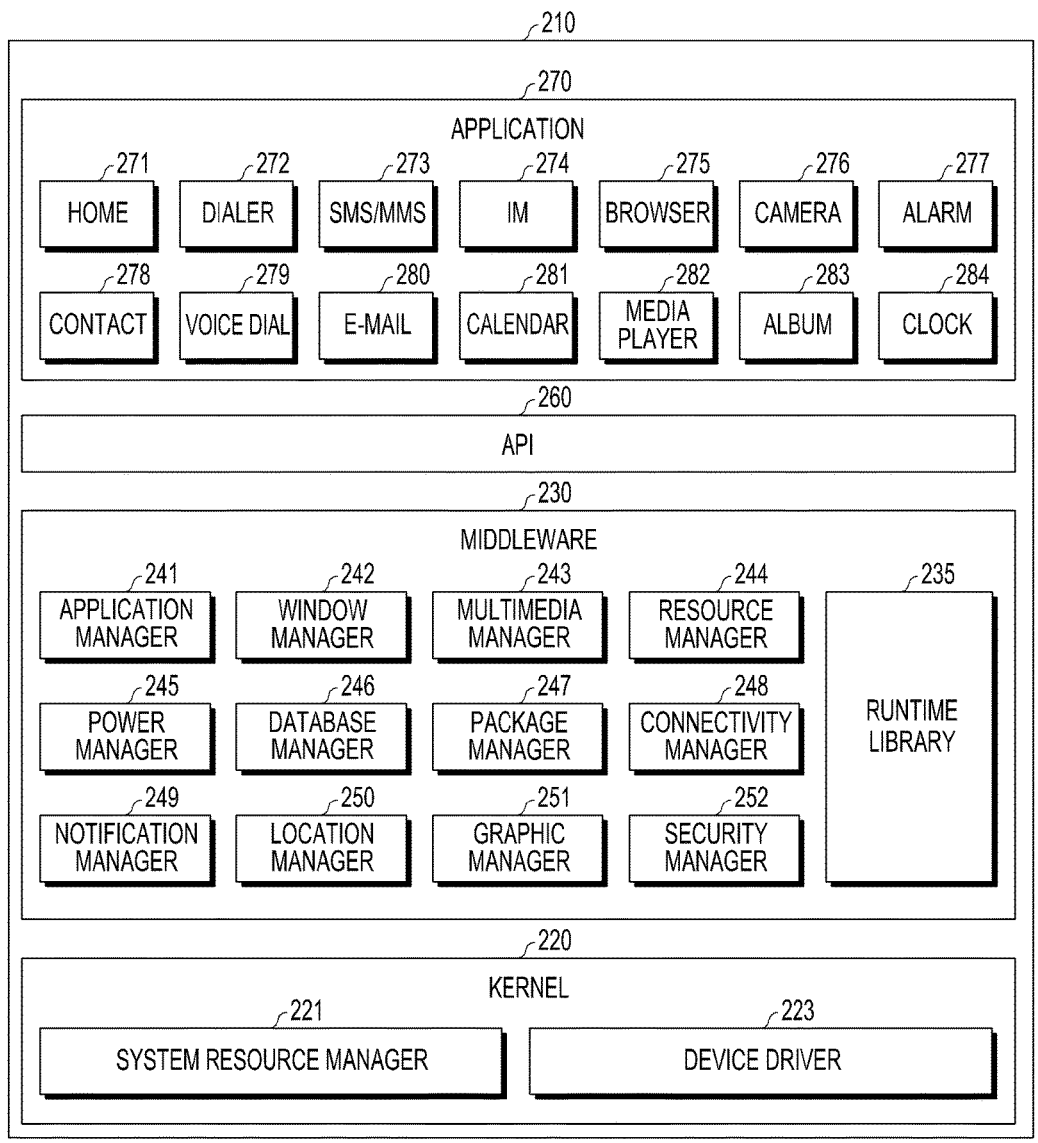
FIG. 2 is a block diagram of a program module according to an embodiment of the present disclosure.

FIG. 2 is a block diagram illustrating a program module according to an embodiment of the present disclosure.

Referring to FIG. 2, a program module 210 (e.g., the program 140) may include an operating system (OS) controlling resources related to the electronic device (e.g., the electronic device 101) and/or various applications (e.g., the application 147) that are driven on the operating system. The operating system may include, e.g., Android™, iOS™, Windows™, Symbian™, Tizen™, or Bada™

The program module 210 may include, e.g., a kernel 220, middleware 230, an API 260, and/or an application 270. At least a part of the program module 210 may be preloaded on the electronic device or may be downloaded from a server (e.g., the server 106).

The kernel 220 (e.g., the kernel 141 of FIG. 1) may include, e.g., a system resource manager 221 and/or a device driver 223. The system resource manager 221 may perform control, allocation, or recovery of system resources and may include a process managing unit, a memory managing unit, and/or a file system managing unit. The device driver 223 may include, e.g., a display driver, a camera driver, a BT driver, a shared memory driver, a USB driver, a keypad driver, a Wi-Fi driver, an audio driver, or an inter-process communication (IPC) driver.

The middleware 230 may provide various functions to the application 270 through the API 260 so that the application 270 may efficiently use limited system resources in the electronic device or provide functions jointly required by applications 270. The middleware 230 (e.g., middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and/or a security manager 252.

The runtime library 235 may include a library module used by a compiler to add a new function through a programming language while, e.g., the application 270 is being executed. The runtime library 235 may perform input/output management, memory management, and/or arithmetic functions.

The application manager 241 may manage the life cycle of at least one application of, e.g., the applications 270. The window manager 242 may manage graphical user interface (GUI) resources used on the screen. The multimedia manager 243 may determine formats necessary to play various media files and use a codec appropriate for a format to perform encoding or decoding on media files. The resource manager 244 may manage resources, such as source code of at least one of the applications 270, memory and/or storage space.

The power manager 245 may operate together with, e.g., a basic input/output system (BIOS) to manage battery or power and provide power information necessary for operating the electronic device. The database manager 246 may generate, search, and/or query a database to be used in at least one of the applications 270. The package manager 247 may manage installation or update of an application that is distributed in the form of a package file.

The connectivity manager 248 may manage wireless connectivity, such as, e.g., Wi-Fi or BT. The notification manager 249 may display or notify an event, such as a coming message, appointment, and/or proximity notification without interfering with the user. The location manager 250 may manage locational information on the electronic device. The graphic manager 251 may manage graphic effects to be offered to the user and their related user interface. The security manager 252 may provide various security functions necessary for system security and/or user authentication. When the electronic device (e.g., the electronic device 101) has telephony capability, the middleware 230 may further include a telephony manager for managing voice call and/or video call functions of the electronic device.

The middleware 230 may include various functions of the above-described components. The middleware 230 may provide a specified module per type of the operating system to provide a differentiated function. Further, the middleware 230 may dynamically omit some existing components or add new components.

The API 260 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 270 (e.g., the application processor 147) may include one or more applications that may provide functions such as, e.g., a home 271, a dialer 272, a short message service (SMS)/multimedia messaging service (MMS) 273, an instant message (IM) 274, a browser 275, a camera 276, an alarm 277, a contact 278, a voice dial 279, an email 280, a calendar 281, a media player 282, an album 283, or a clock 284, a health-care (e.g., measuring the degree of workout or blood sugar) (not shown), and/or environmental information (e.g., provision of air pressure, moisture, or temperature information) (not shown).

The application 270 may include an information exchanging application supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, a notification relay application may include a function for relaying notification information generated from other applications of the electronic device (e.g., the SMS/MMS application, the email application, the health-care application, or the environmental information application) to the external electronic device (e.g., the electronic devices 102 and 104). Further, the notification relay application may receive notification information from, e.g., the external electronic device and may provide the received notification information to the user. A device management application may perform at least some functions of the external electronic device (e.g., the electronic device 102 or 104) such as, for example, turning on/off the external electronic device (or some components of the external electronic device), control brightness (or resolution) of the display, etc. The device management application may manage (e.g., install, delete, or update) an application operating in the external electronic device or a service (e.g., call service or message service) provided from the external electronic device.

The application 270 may include an application (e.g., a health-care application) selected depending on the attribute (e.g., as an attribute of the electronic device, the type of electronic device is a mobile medical device) of the external electronic device (e.g., the electronic devices 102 and 104). The application 270 may include an application received from the external electronic device (e.g., the server 106 or electronic devices 102 and 104). The application 270 may include a preloaded application or a third party application downloadable from a server. The names of the components of the program module 210 according to the shown embodiment may be varied depending on the type of operating system.

At least a part of the program module 210 may be implemented in software, firmware, hardware, or in a combination of two or more thereof. At least a part of the programming module 210 may be implemented (e.g., executed) by e.g., a processor (e.g., the AP 210). At least a part of the program module 210 may include e.g., a module, a program, a routine, a set of instructions, a process, or the like for performing one or more functions.

Figure 3:
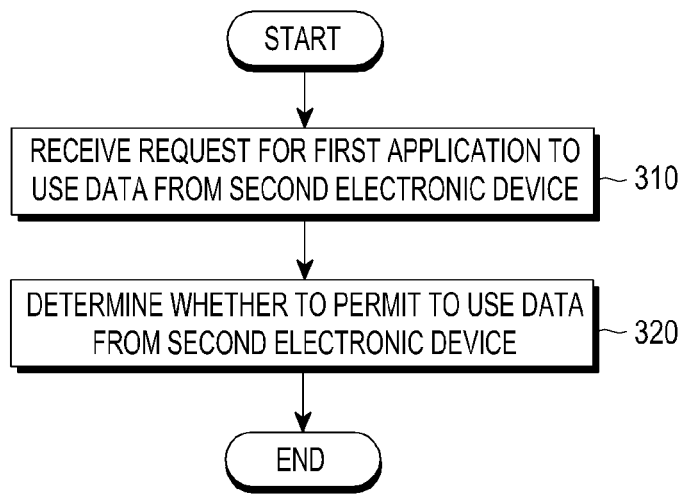
FIG. 3 is a flowchart of a method for controlling a first electronic device according to an embodiment of the present disclosure.

FIG. 3 is a flowchart of a method for controlling a first electronic device according to an embodiment of the present disclosure.

Referring to FIG. 3, in operation 310, the first electronic device 101 may receive a request for the first application to use data from the second electronic device 102. The first electronic device 101 may be connected with the first electronic device 102 based on a predetermined communication scheme. The first electronic device 101 may also be connected with the third electronic device 103 and the fourth electronic device 104. In operation 320, the first electronic device 101 may determine whether to permit the first application 410 to use the data from the second electronic device 102. Further, the first electronic device 101 may control the use by the first application 410 of the data from the second electronic device 102 based on the determination.

Figure 4A:
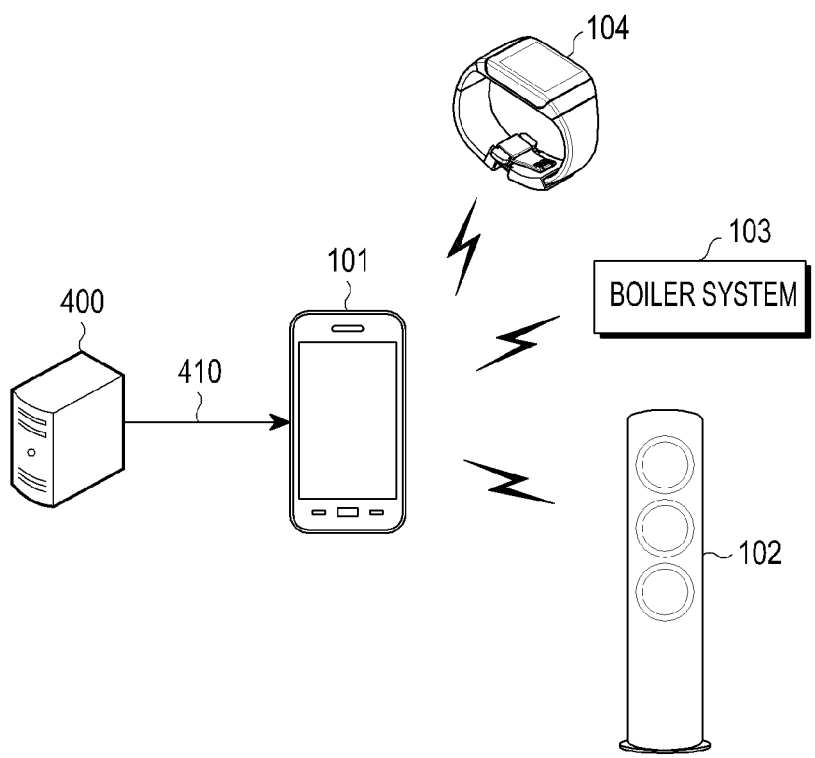
FIGS. 4A, 4B, and 4C are views illustrating application management according to various embodiments of the present disclosure.
Figure 4B:
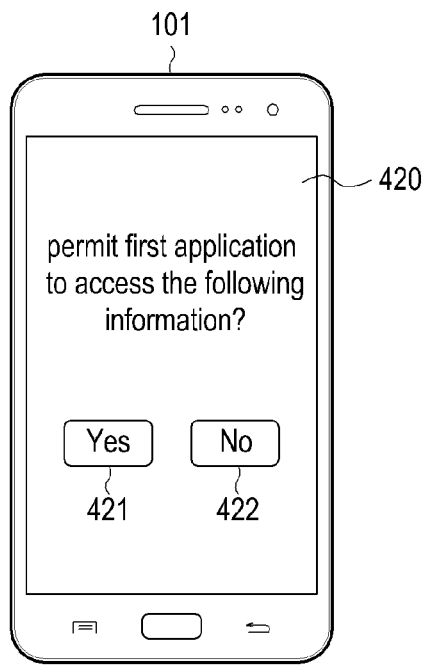
Figure 4C:
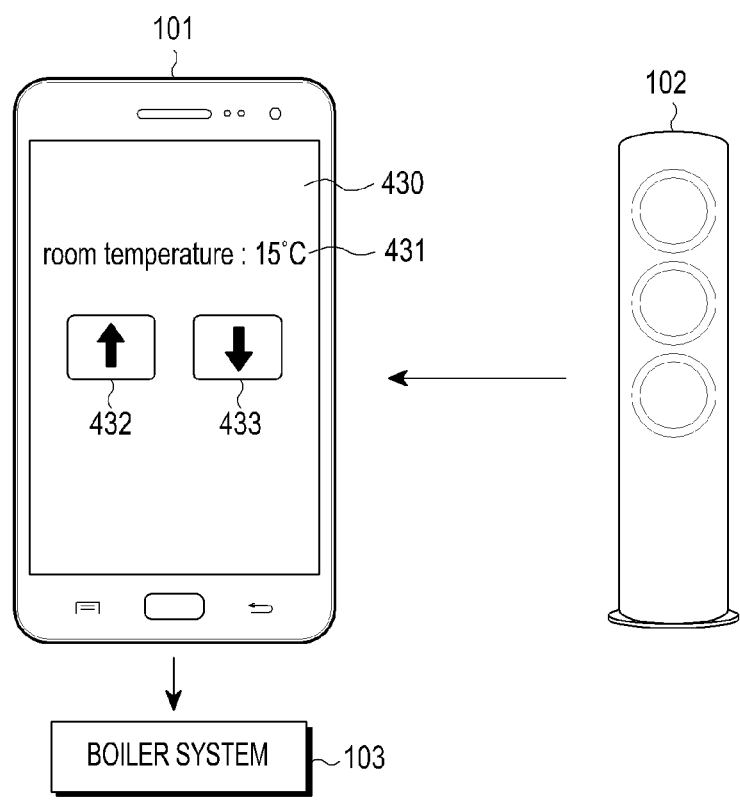

FIGS. 4A, 4B, and 4C are views illustrating application management according to various embodiments of the present disclosure Referring to FIG. 4A, the first electronic device 101 may download a first application 410 from a server 400. The first electronic device 101 may send a request to download the first application 410 to the server 400. For example, the first application 410 may be a boiler control application to control a boiler system, which corresponds to the third electronic device 103. The first application 410 may use temperature data received from the second electronic device 102. The type of data used by the first application 410 may be previously stored in the server 400. For example, the manufacturer of the first application 410 may declare the type of data used by the first application 410. For example, the application may include the declared data type in the form of metadata and may store the same in a manifest file. The server 400 may store the declared data type, corresponding to the first application 410. The server 400 may also receive a request to download data of the first application 410 from the first electronic device 101. The server 400 may transmit the type of data used by the first application 410 to the first electronic device 101 based on the received download request. The first electronic device 101 may receive a request for the first application 410 to use the second electronic device 102 based on the type of data used by the first application 410. Meanwhile, without receiving the download request from the first electronic device 101, the server 400, when the first electronic device 101 accesses a page for downloading the first application 410 (e.g., a uniform resource locator (URL) for downloading the first application 410), may provide the type of data used by the first application 410, based on the download page. Meanwhile, the first electronic device 101, while running the first application 410, may receive a request to use the data from the second electronic device 102, which is described below. The first electronic device 101 may previously store data types associated with the electronic devices 102, 103, and 104. The first electronic device 101, while forming connections to the electronic devices 102, 103, and 104, may previously store the associated data types. The first electronic device 101 may receive the request for the first application 410 to use data from, e.g., the second electronic device 102 by comparing the type of data used by the first application 410 with the data types associated with the electronic device 102, 103, and 104.

Referring to FIG. 4B, the first electronic device 101 may display a user graphic interface 420 inquiring the first application 410 about whether to use the second electronic device 102. The user graphic interface 420 may display the intent that the first application 410 uses information from the second electronic device 102, e.g., an air conditioner, a permit button 421, and a reject button 422. When permit button 421 is selected, the first electronic device 101 may permit the first application 410 to use the data from the second electronic device 102. The first electronic device 101 may also permit the first application 410 to transmit data to the second electronic device 102. Referring to FIG. 4C, the first electronic device 101 may download the first application 410 from the server 400 and may run the first application 410. The first electronic device 101 may display a first application running screen 430. The first application running screen 430 is for controlling, e.g., the boiler system 103, and may include a room temperature 431, a temperature-up instruction button 432, and a temperature-down instruction button 433. The first electronic device 101 may enable the first application 410 to receive temperature information from the second electronic device 102. The first application 410 may receive the temperature information from the second electronic device 102 and may reflect the received temperature information to the application running screen 430.

When the reject button 422 is selected, the first electronic device 101 may not permit the first application 410 to use the data from the second electronic device 102. The first electronic device 101 may not download the first application running screen 410. The first electronic device 101 may download the 410 and perform control not to transfer the temperature information from the second electronic device 102 to the first application 410.

Meanwhile, although the first electronic device 101 determines whether to permit the first application 410 to use the data from the second electronic device 102, this is merely an example. In another embodiment, the first electronic device 101 may determine whether to allow the first application 410 a right to control the second electronic device 102. Here, the right to control may mean a right by which the first application 410 may control the second electronic device 102.

Figure 5:
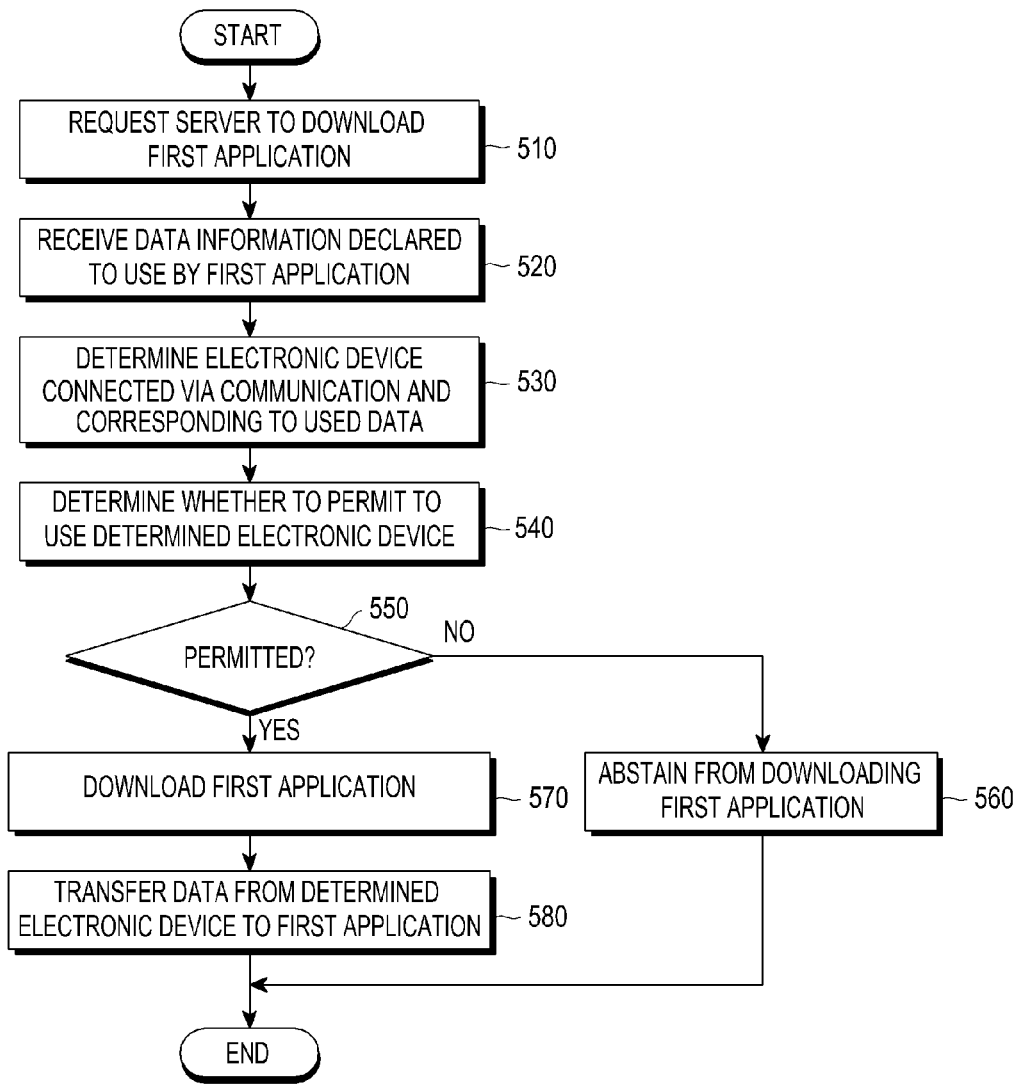
FIG. 5 is a flowchart illustrating a method for controlling an electronic device according to an embodiment of the present disclosure.
Figure 6A:
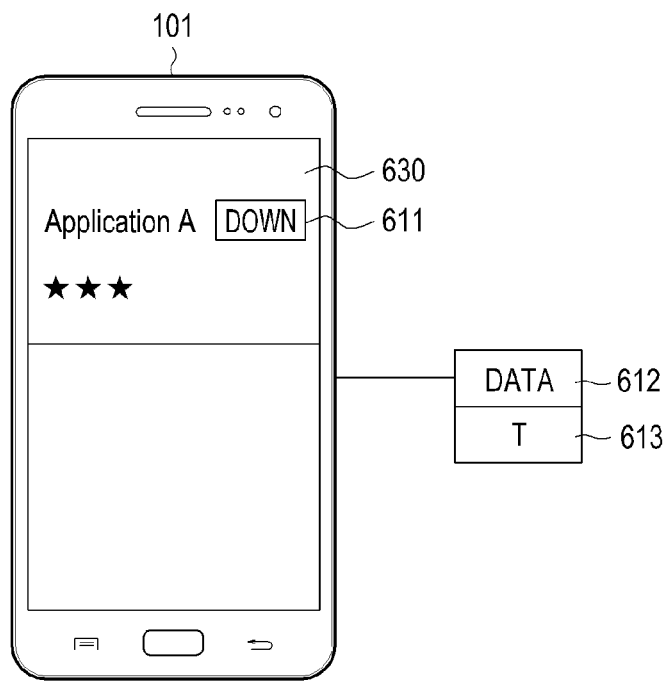
FIGS. 6A, 6B, and 6C are concept views illustrating an electronic device according to an embodiment of the present disclosure.
Figure 6B:
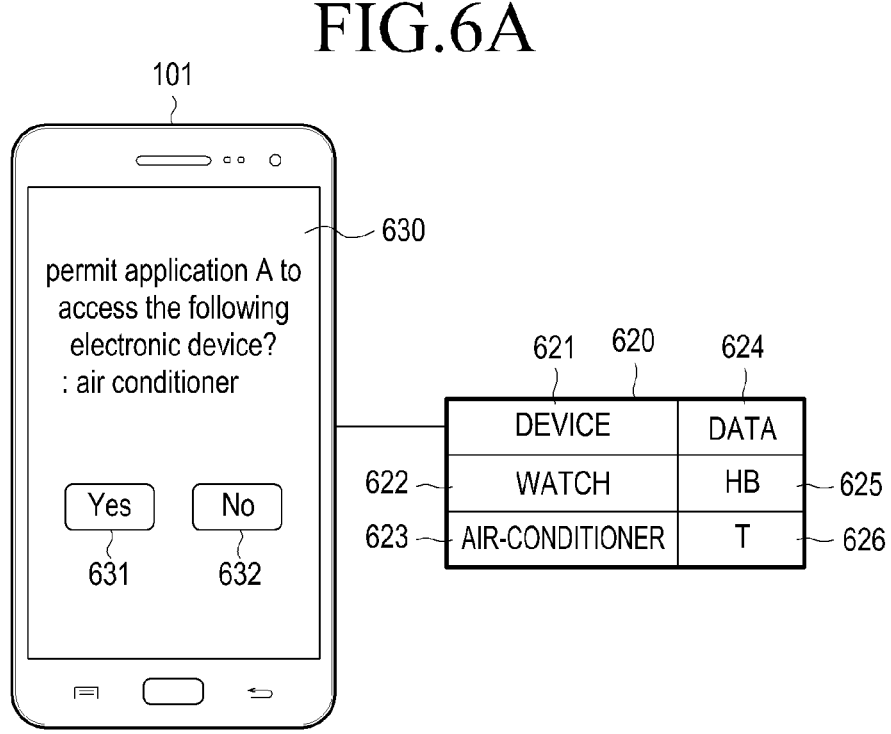
Figure 6C:
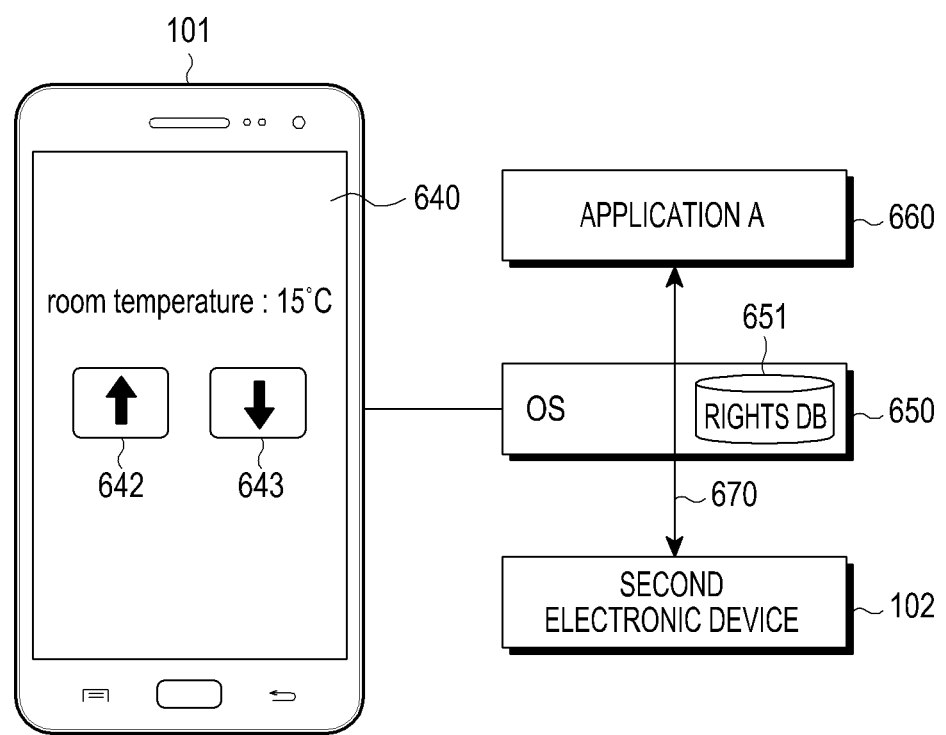

FIG. 5 is a flowchart illustrating a method for controlling an electronic device according to an embodiment of the present disclosure, and FIGS. 6A, 6B, and 6C are views illustrating an electronic device according to an embodiment of the present disclosure.

Referring to FIGS. 5, 6A, 6B, and 6C, a flowchart of the method illustrated in FIG. 5 is described with reference to the views in FIGS. 6A, 6B, and 6C. In operation 510, the first electronic device 101 may send a request to a server to download a first application. The first electronic device 101 may previously store and run an application to download the first application. The download application may enable the first electronic device 101 to access a download server and send a request to download to the server.

In operation 520, the first electronic device 101 may receive data information to use by the first application, e.g., type of data.

For example, the first electronic device 101 may display a download application screen that displays during execution. The download application running screen 630 may include application identification information and a download running button 611. The first electronic device 101 may receive information on the type 612 of data used by the application from the server. For example, the first electronic device 101 may receive, from the server, information indicating that the type 612 of the data used by the first application is a temperature (T) 613.

In operation 530, the first electronic device may determine an electronic device connected to the first electronic device based on the type of the used data.

For example, the first electronic device 101 may previously store association information 620 between an electronic device 621 connected to the first electronic device 101 and a data type 624 corresponding thereto. The first electronic device 101 may obtain the data type 624 that is input/output from the electronic device 621 by connecting to the connected electronic device 621, e.g., in a pairing or discovery process. The first electronic device 101 may be connected with a wrist watch-type electronic device 622 and an air conditioner 623. The first electronic device 101 may obtain information indicating that a type of data input/output from the wrist watch-type electronic device 622 is a heartbeat (HB) 625. The first electronic device 101 may obtain information indicating that the type of data input/output from the air conditioner 623 is a temperature 626. The first electronic device 101 may store association information between the connected electronic device 621 and a data type 624 corresponding thereto.

The first electronic device 101 may determine an electronic device used by the first application based on the association information between the connected electronic device 621 and the data type. The type 612 of the data used by the first application is a temperature 613, and the connected electronic device corresponding to the temperature 626 in the association information is the air conditioner 623.

In operation 540, the first electronic device 101 may determine whether to permit use of the determined electronic device. For example, the first electronic device 101 may display a graphic user interface 630 inquiring whether to permit access to the second electronic device 102, e.g., the air conditioner, via a permit button 631 and a reject button 632.

In operation 550, the first electronic device 101 may determine whether to use the determined electronic device. For example, when the reject button 632 is selected in the graphic user interface 630, the first electronic device 101 may not permit the first application 410 to use the second electronic device 102 in operation 560. For example, when the permit button 631 is selected in the download application screen 630, the first electronic device 101 may permit the first application 410 to use the second electronic device 102 in operation 570.

When the first application is permitted to use the second electronic device 102, the first electronic device 101 may download the first application in operation 570. In operation 580, the first electronic device 101 may transfer data from the determined electronic device to the first application.

For example, the first electronic device 101 may run the first application and display a first application running screen 640. The first application may be a boiler system control application. The first application running screen 640 may include information on a room temperature, a temperature-up instruction button 642, and a temperature-down instruction button 643. The first electronic device 101 may receive the temperature information from the second electronic device 102 and may transfer the received temperature information to the first application.

A rights database 651 may be defined in an OS layer 650 of the first electronic device 101. The rights database 651 may store association information between applications stored in the first electronic device 101 and data or resources permitted for each application. For example, the first application may be assigned a right to use data from the second electronic device 102 or a right to control the second electronic device 102. The rights database 651 may store the first application in association with the second electronic device 102. Data 670 received from the second electronic device 102 may be transferred to the OS 650. The OS 650 may determine whether to transfer the data 670 to the first application layer 660 based on the rights database 651. The OS 650 may transfer the data from the second electronic device 102 to the first application layer 660.

Meanwhile, although the first electronic device 101 downloads the application from the server as described above, this is merely an example. The first electronic device 101 may download the application from another electronic device and, in this case, may determine whether to use the other electronic device for the application in the same way described above.

Figure 7:
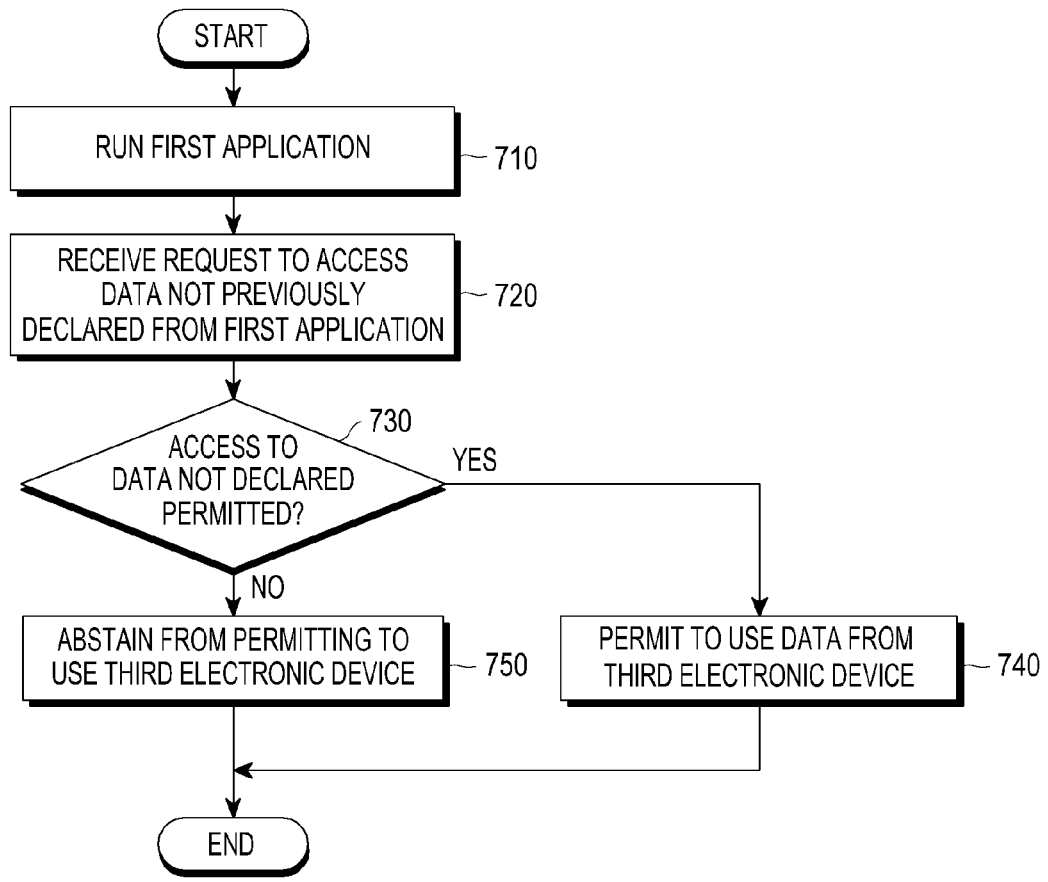
FIG. 7 is a flowchart illustrating a method for controlling an electronic device according to an embodiment of the present disclosure.
Figure 8A:
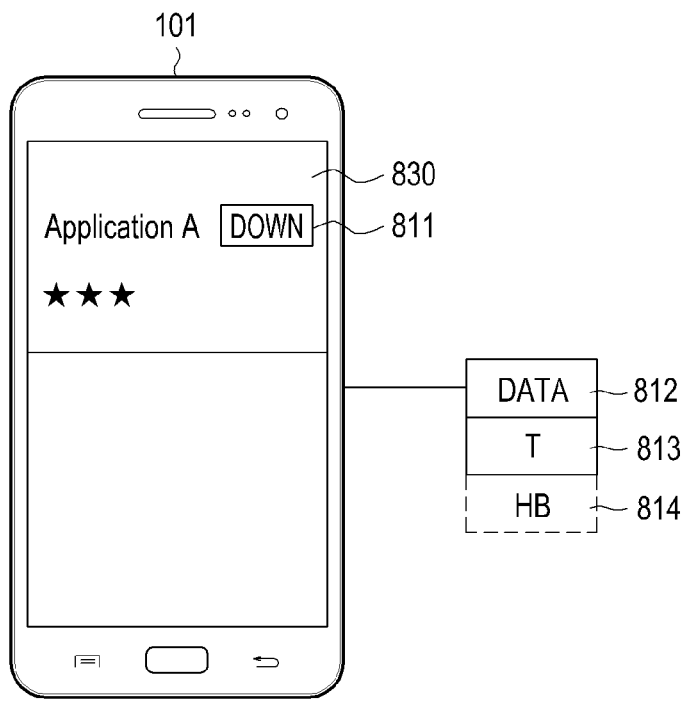
FIGS. 8A, 8B, 8C, 8D and 8E are views illustrating an electronic device according to an embodiment of the present disclosure.
Figure 8B:
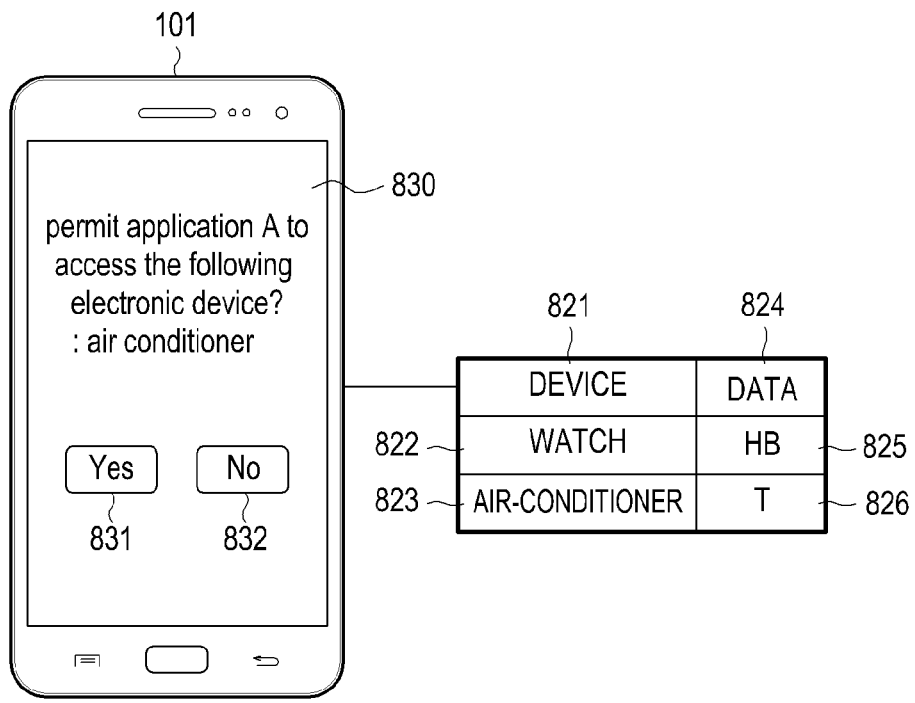
Figure 8C:
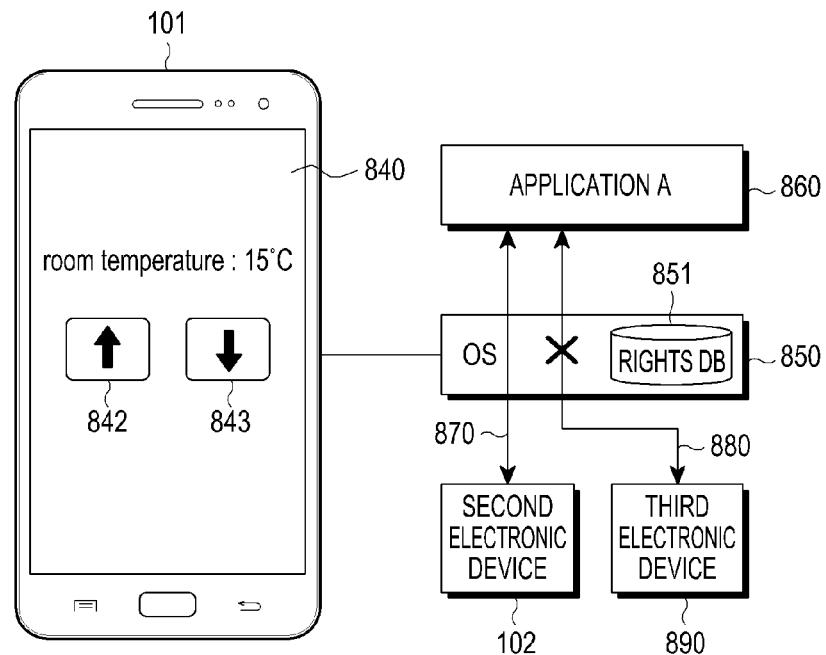
Figure 8D:
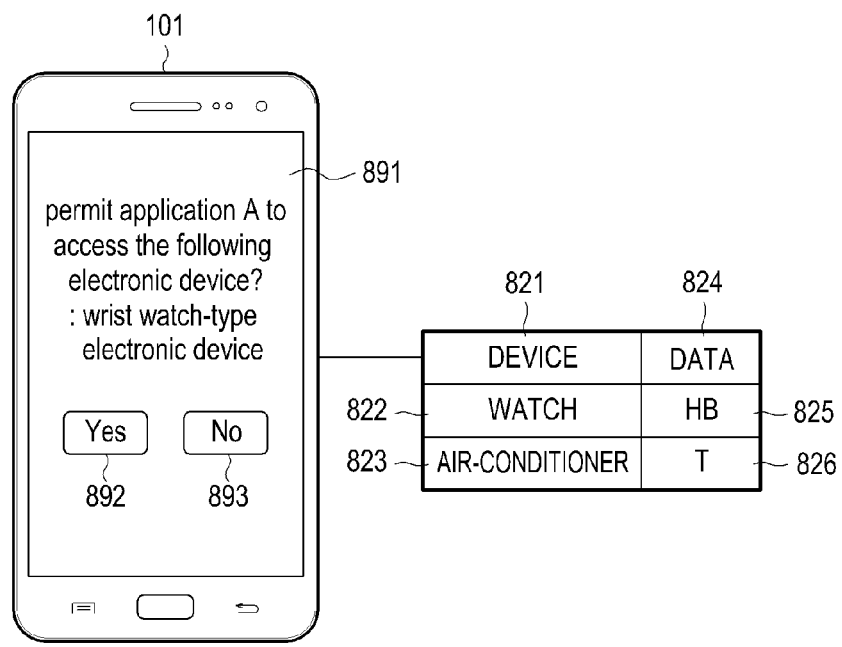
Figure 8E:
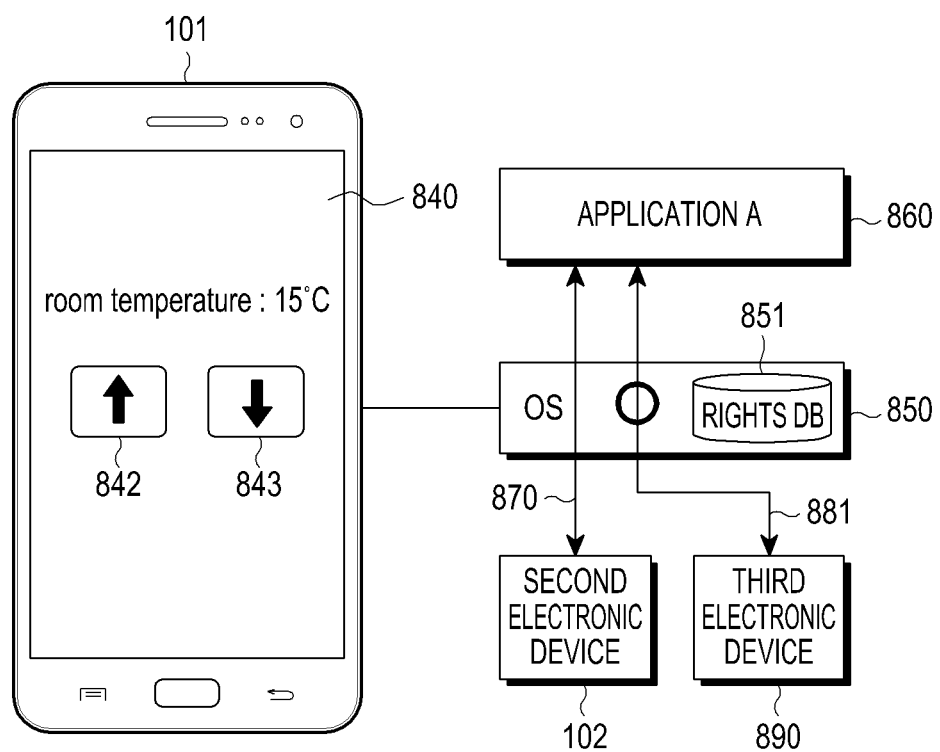

FIG. 7 is a flowchart illustrating a method for controlling an electronic device according to an embodiment of the present disclosure, and FIGS. 8A 8B, 8C, 8D and 8E are views illustrating an electronic device according to an embodiment of the present disclosure.

Referring to FIGS. 7, 8A 8B, 8C, 8D and 8E, a flowchart of the method illustrated in FIG. 7 is described with reference to the views in FIGS. 8A 8B, 8C, 8D and 8E. In operation 710, the first electronic device 101 may run the first application. The first application may be a boiler system control application.

The first electronic device 101 may download the first application. The download screen 830 may include application identification information and a download instruction button 811. As described above, the application manufacturer may declare the type 812 of data used by the application upon registering the application on the server. The server may manage the declared data type 812. Meanwhile, it is assumed that the type 812 of data used is temperature 813 and an HB 814 is not declared. That is, the first application, when run, may declare the use of temperature information upon registration with the server.

The first electronic device 101 may previously store association information between an electronic device 821 and a data type 824 corresponding thereto. The first electronic device 101 may obtain the data type 824 input/output from the electronic device 821 when connecting to the connected electronic device 821, e.g., in a pairing process. The first electronic device 101 may be connected to a wrist watch-type electronic device 822 and an air conditioner 823. The first electronic device 101 may obtain information indicating that the type of data input/output from the wrist watch-type electronic device 822 is an HB 825. The first electronic device 101 may obtain information indicating that the type of data input/output from the air conditioner 823 is temperature 826. The first electronic device 101 may store association information between the connected electronic device 821 and a data type 824 corresponding thereto.

The first electronic device 101 may determine an electronic device used by the first application based on the association information between the electronic device 821 and the data type 824 and the type 812 of data used by the first application. The type 812 of the data used by the first application may be temperature 813, and the connected electronic device corresponding to the temperature 826 in the association information is the air conditioner 823.

In operation 720, the first electronic device 101 may receive a request to access the data not previously declared from the first application.

The first electronic device 101 may run the first application and display a first application running screen 840. The first application running screen 840 may include a temperature-up instruction button 842 and a temperature-down instruction button 843. The first application may send a request to use heart beat information from the third electronic device 890, e.g., a wrist watch-type electronic device. The first electronic device 101 may determine whether to determine use of data of the first application using the rights database 851 defined in the OS 850. As described above, the rights database 851 may store association information that permits the first application to use the data from the processor 120 but does not permit the first application to use the data from the third electronic device 890. Accordingly, the first electronic device 101 may transfer the data from the processor 120 to the first application but may not transfer the data from the third electronic device 890 to the first application.

Meanwhile, the first electronic device 101 may re-determine whether to permit access to the data not declared in operation 730.

For example, the first electronic device 101 may display a graphic user interface 891 inquiring whether to permit the first application to access the third electronic device 890. As described above, the first electronic device 101 may receive a request to access the heartbeat information from the first application and may determine that the first electronic device 101 intends to access the third electronic device 890, e.g., a wrist watch-type electronic device 822, based on the pre-stored association information. The first electronic device 101 may display a graphic user interface 891 including the intent that the first application makes a request to access the wrist watch-type electronic device 822, a permit button 892, and a reject button 893.

When permitted to access the data not declared, the first electronic device 101 may permit the first application to use the data from the third electronic device 890 in operation 740. For example, when the permit button 892 is selected, the first electronic device 101 may transfer the data from the third electronic device 890 to the first application in operation 881. The permit button 892 may cause the first electronic device 101 to transfer the data from the second electronic device 102 to the first application in operation 870.

When permitted to access the data not declared, the first electronic device 101 may not permit the first application to use the data from the third electronic device 890 in operation 750. For example, when the reject button 893 is selected, the first electronic device 101 may not transfer the data from the third electronic device 890 to the first application.

As described above, even when the application accesses the data not previously declared, the first electronic device 101 may determine whether to permit the application to use the data.

Figure 9:
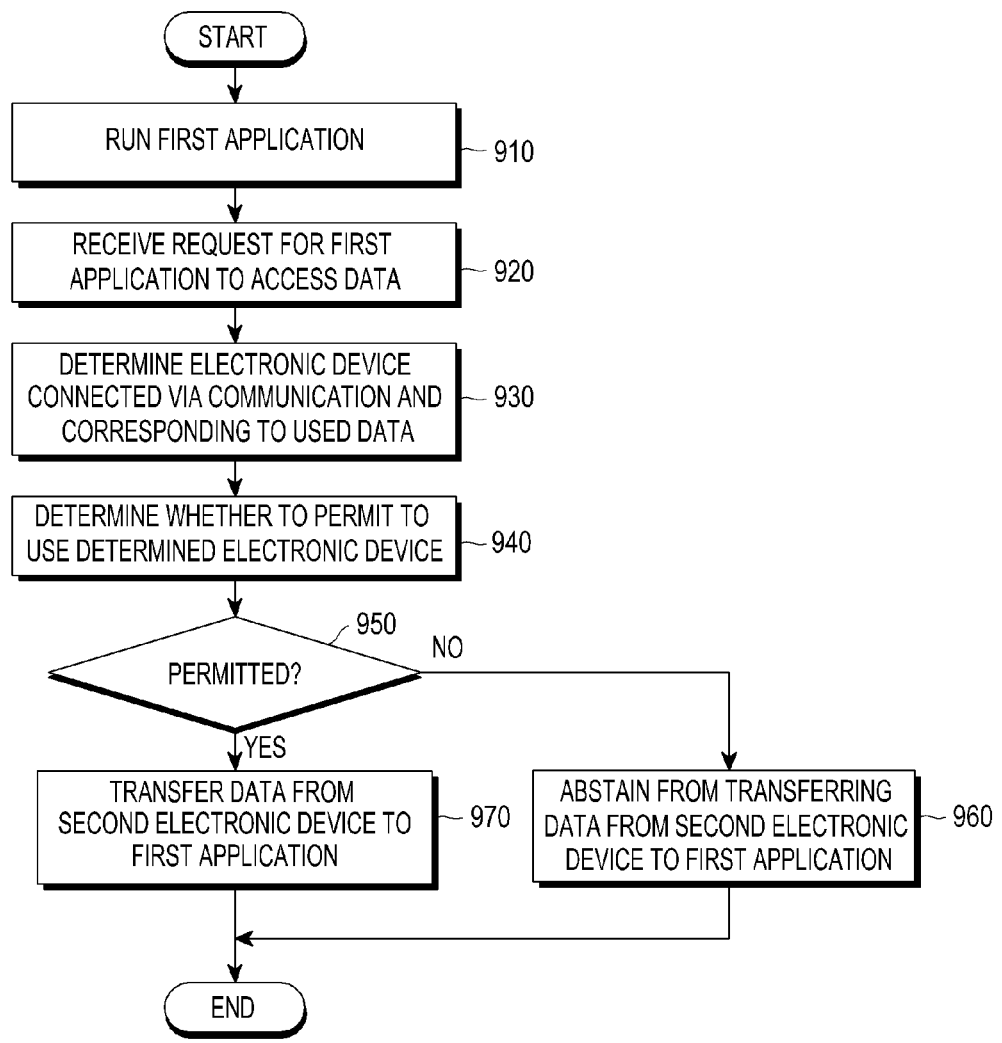
FIG. 9 is a flowchart illustrating a method for controlling an electronic device according to an embodiment of the present disclosure.
Figure 10A:
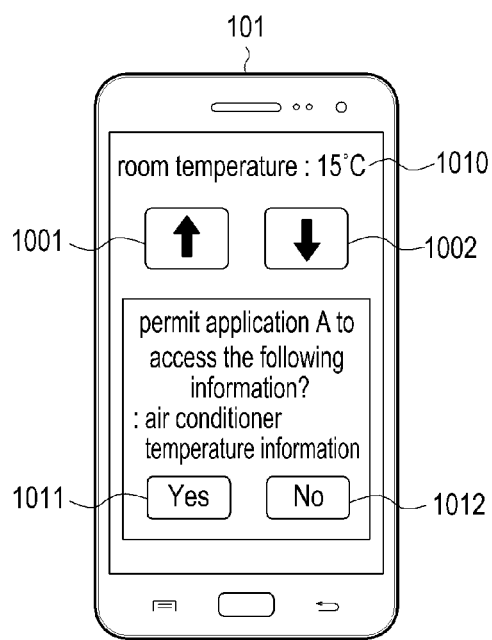
FIGS. 10A and 10B are views illustrating an electronic device according to an embodiment of the present disclosure.
Figure 10B:
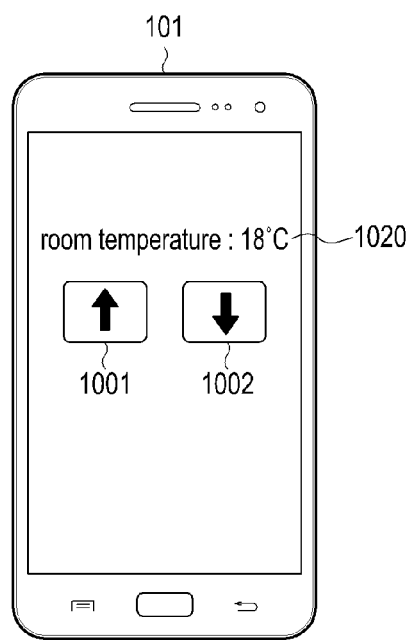

FIG. 9 is a flowchart illustrating a method for controlling an electronic device according to an embodiment of the present disclosure, and FIGS. 10A and 10B are views illustrating an electronic device according to an embodiment of the present disclosure.

Referring to FIGS. 9, 10A, and 10B, a flowchart of the method illustrated in FIG. 7 is described with reference to the views in FIGS. 8A 8B, 8C, 8D and 8E.

In operation 910, the first electronic device 101 may run the first application. The first electronic device 101 may previously download the first application from a server, and the first electronic device 101 may run the stored first application. The first application may be a boiler system control application.

For example, the first electronic device 101 may display a first application running screen 1000. The first application running screen 1000 may include information that a current room temperature is 15 Celsius degrees, a temperature-up instruction button 1001, and a temperature-down instruction button 1002. Meanwhile, the boiler system control application may send a request to use the current temperature information from the second electronic device 102, e.g., an air conditioner, to the first electronic device 101.

In operation 920, the first electronic device 101 may receive a request to access the data from the first application. In operation 930, the first electronic device 101 may determine an electronic device connected to the first electronic device based on the type of the used data. For example, the first electronic device 101 may previously store association information between an electronic device connected with the first electronic device 101 and a data type corresponding thereto. The first electronic device 101 may obtain the data type input/output from the connected electronic device while connecting to the connected electronic device, e.g., in a pairing process. The first electronic device 101 may determine an electronic device used by the first application based on the association information between the connected electronic device and the data type corresponding thereto and the received type of data used by the first application.

In operation 940, the first electronic device 101 may determine whether to permit use of the determined electronic device. For example, the first electronic device 101 may display a graphic user interface 1010 including the message that the first application requests to access the second electronic device 102, e.g., an air conditioner, via a permit button 1011 and a reject button 1012. In operation 950, the first electronic device 101 may identify whether to permit the access and may control the first application to use the second electronic device 102.

If not permitted, the first electronic device 101 may not transfer the data from the second electronic device 102 to the first application in operation 960.

If permitted, the first electronic device 101 may transfer the data from the second electronic device 102 to the first application in operation 970.

For example, the first application may display the temperature information 1020 received from the second electronic device 102.

As described above, the first electronic device 101 may determine whether to permit to use the other connected electronic device at the time of running the application, as well as at the time of downloading the application.

Figure 11:
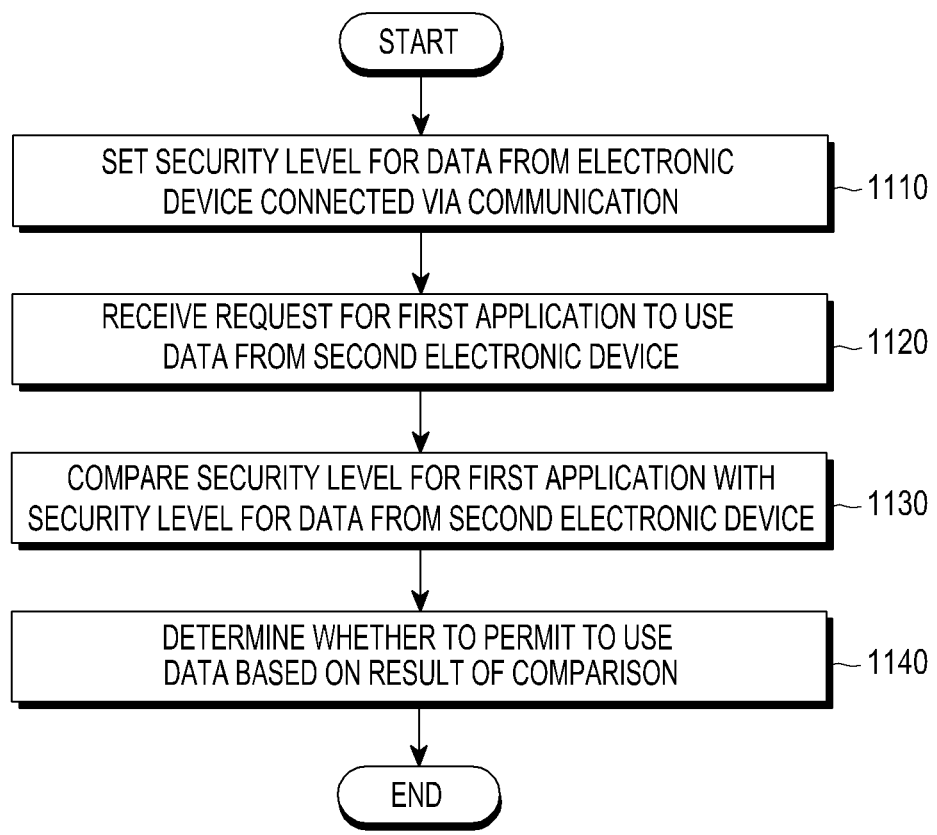
FIG. 11 is a flowchart illustrating a method for controlling an electronic device according to an embodiment of the present disclosure.

FIG. 11 is a flowchart illustrating a method for controlling an electronic device according to an embodiment of the present disclosure.

Referring to FIG. 11, in operation 1110, the first electronic device 101 may set a security level for data from an electronic device connected via communication. The following Table 1 shows examples of security levels.

TABLE 1

| Connected electronic device | Type of data | Security level |
|---|---|---|
| Wrist watch-type electronic device | HB | High |
| Air conditioner | T | Normal |

As shown in the examples of Table 1, the first electronic device 101 may set a high (highly trusted) security level to the use of data from the wrist watch-type electronic device or use of the wrist watch-type electronic device and may set a normal (trusted) security level to use the data of the air conditioner.

The first electronic device 101, when forming a connection with other electronic devices, may obtain a security level for each connected electronic device. For example, security levels may be previously set for the wrist watch-type electronic device and the air conditioner, respectively. When a connection between the first electronic device 101 and the wrist watch-type electronic device is formed, the first electronic device 101 may obtain a security level for the wrist watch-type electronic device, i.e., a high security level. The first electronic device 101 may store association information between a connected electronic device and a security level corresponding thereto. The first electronic device 101 may store association information between the connected electronic device, type of data input/output from the connected electronic device, and security level as shown in Table 1. Alternatively, a security level may be set per data from the connected electronic device based on a user input.

In operation 1120, the first electronic device 101 may receive a request for the first application to use data from the second electronic device. The first electronic device 101 may receive a request for the first application to use the data while installing the first application. Or, the first electronic device 101 may run the first application and then receive a request for the first application to use the data from the second electronic device 102.

In operation 1130, the first electronic device 101 may compare the security level for the first application with the security level for the data from the second electronic device 102. The first electronic device 101 may obtain the security level for the first application in the process of installing the first application. For example, a normal (trusted) security level may be set for the first application. The security level for the first application may be set by the application manufacturer, a download server, or the user of the first electronic device 101. The first electronic device 101 may determine that the normal (trusted) security level for the first application is lower than the high (highly trusted) security level set for the data from the wrist watch-type electronic device. The first electronic device 101 may determine that the normal (trusted) security level for the first application is the same as the normal (trusted) security level set for the data from the air conditioner.

In operation 1140, the first electronic device 101 may determine whether to permit the use of data based on a result of the comparison. When the security level for the first application is higher or equal to the security level set to the data from the connected electronic device, the first electronic device 101 may permit the first application to use the data. When it is determined that the normal security level for the first application is lower than the high security level set to the data from the wrist watch-type electronic device, the first electronic device 101 may not permit the first application to use the wrist watch-type electronic device. When it is determined that the normal security level for the first application is the same as the normal security level set to the data from the air conditioner, the first electronic device 101 may permit the first application to use the air conditioner.

As described above, the first electronic device 101 may determine whether to permit to use the connected electronic device based on the security level per application.

Figure 12:
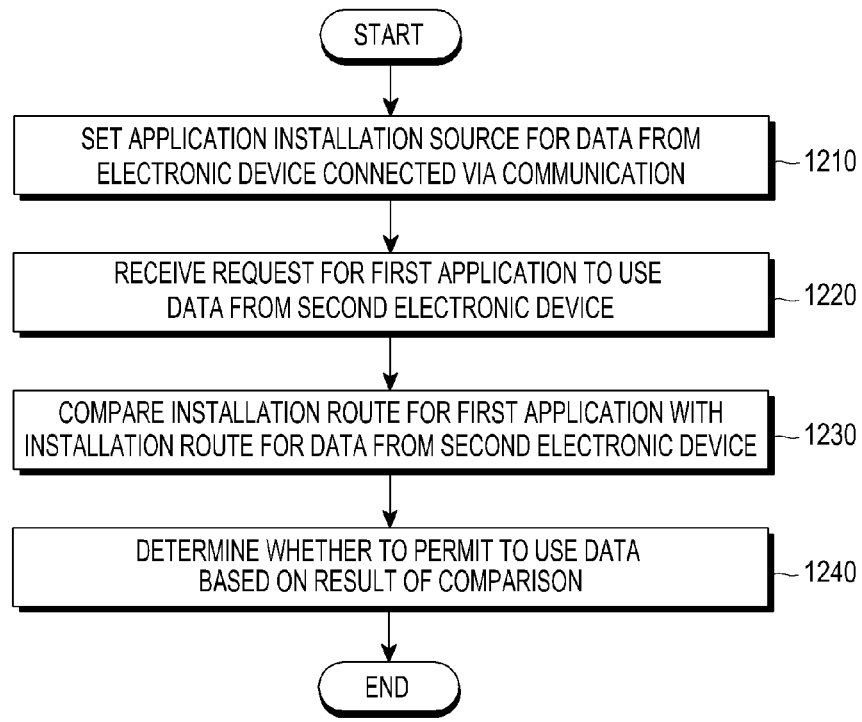
FIG. 12 is a flowchart illustrating a method for controlling an electronic device according to an embodiment of the present disclosure.

FIG. 12 is a flowchart illustrating a method for controlling an electronic device according to an embodiment of the present disclosure.

Referring to FIG. 12, in operation 1210, the first electronic device 101 may set an application installation route for data from an electronic device connected via communication. Table 2 shows examples of application installation routes.

TABLE 2

| Connected electronic device | Type of data | Installation source |
|---|---|---|
| Wrist watch-type electronic device | HB | Market |
| Air conditioner | T | Market, sideload |

As shown in the examples of Table 2, the first electronic device 101 may set a market-level application installation source for the use of data from the wrist watch-type electronic device or use of the wrist watch-type electronic device and may set a market-level or sideload-level application installation route for the air conditioner. Specifically, the wrist watch-type electronic device is permitted only for the application installed through the market, and the use of the air conditioner is permitted for the application installed through the market or sideload. Here, the term sideload may indicate being downloaded from an electronic device other than the market.

The first electronic device 101, when forming a connection with other electronic devices, may obtain an application installation source for each connected electronic device. For example, permitted application installation sources may be previously set for the wrist watch-type electronic device and the air conditioner, respectively. While a connection between the first electronic device 101 and the wrist watch-type electronic device is formed, the first electronic device 101 may obtain an application installation source permitted for the wrist watch-type electronic device, i.e., the market-level application installation source. The first electronic device 101 may store association information between a connected electronic device and a permitted application installation source corresponding thereto. The first electronic device 101 may store association information between the connected electronic device, type of data input/output from the connected electronic device, and permitted application installation source as shown in Table 2. Alternatively, a permitted application installation source may be set per data from the connected electronic device based on a user input.

In operation 1220, the first electronic device 101 may receive a request for the first application to use data from the second electronic device. The first electronic device 101 may receive a request for the first application to use the data from the second electronic device 102 while installing the first application. Or, the first electronic device 101 may run the first application and receive a request for the first application to use the data from the second electronic device 102.

In operation 1230, the first electronic device 101 may compare the installation source for the first application with the permitted application installation source for the data from the second electronic device 102. The first electronic device 101 may obtain the installation source for the first application while installing the first application. For example, the first application is assumed to be sideloaded. The first electronic device 101 may determine that the electronic device permitted for the sideload installation source for the first application is the air conditioner.

In operation 1240, the first electronic device 101 may determine whether to permit use of data based on a result of the comparison. The first electronic device 101 may determine that the electronic device permitted for the sideload installation source for the first application is the air conditioner and may permit the first application to use the data from the air conditioner. Further, the first electronic device 101 may determine not to permit the sideloaded application to use the data from the wrist watch-type electronic device.

Figure 13:
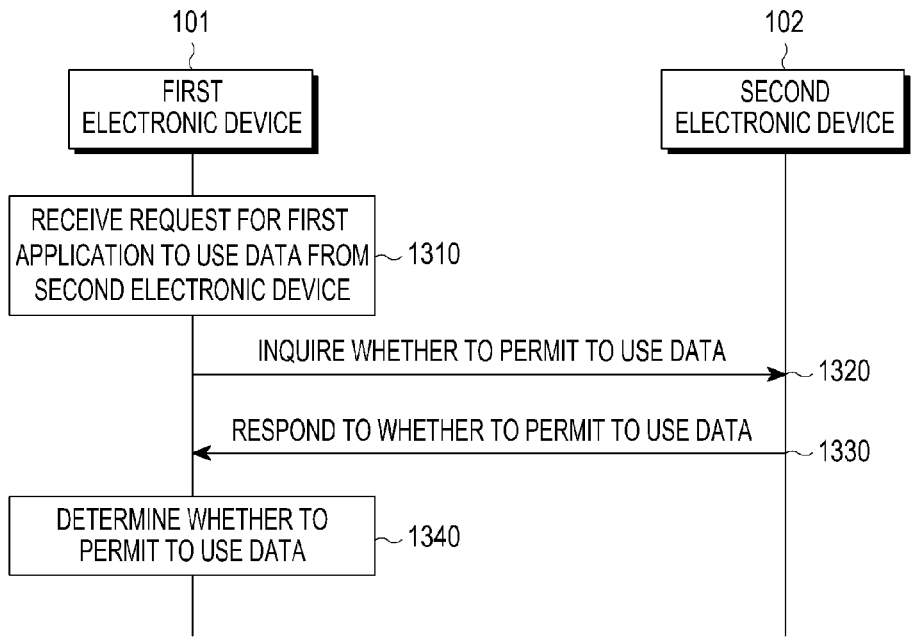
FIG. 13 is a flowchart illustrating a method for controlling an electronic device according to an embodiment of the present disclosure.
Figure 14A:
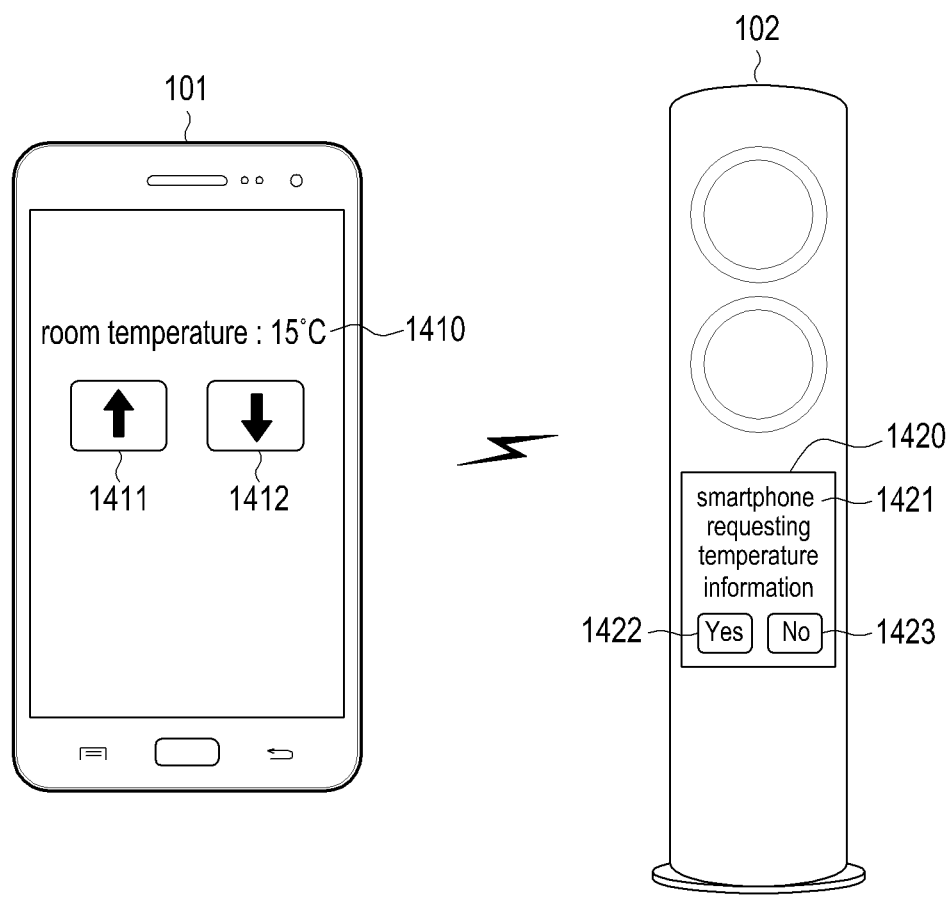
FIGS. 14A and 14B are concept views illustrating an electronic device according to various embodiments of the present disclosure.
Figure 14B:
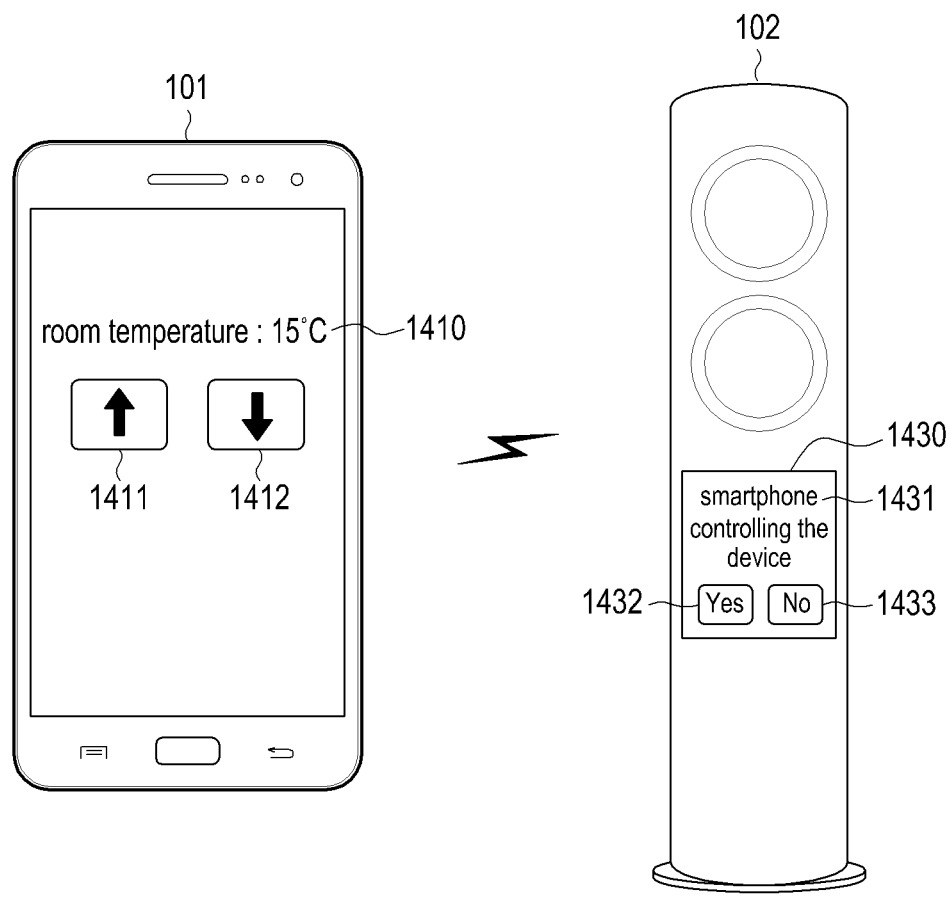

FIG. 13 is a flowchart illustrating a method for controlling an electronic device according to an embodiment of the present disclosure, and FIGS. 14A and 14B are views illustrating an electronic device according to embodiments of the present disclosure.

Referring to FIGS. 13, 14A, and 14B, a flowchart of the method illustrated in FIG. 13 is described with reference to the views in FIGS. 14A and 14B.

In operation 1310, the first electronic device 101 may receive a request for the first application to use data from the second electronic device 102. The first electronic device 101 may receive a request for the first application to use the data from the second electronic device 102 while installing the first application. Or, the first electronic device 101 may run the first application and receive a request for the first application to use the data from the second electronic device 102.

In operation 1320, the first electronic device 101 may send an inquiry as to whether to permit use of data to the second electronic device 102.

For example, the first electronic device 101 may run the first application and display a first application running screen 1410. The first application running screen 1410 may include a room temperature, a temperature-up instruction button 1411 and a temperature-down instruction button 1412. The first electronic device 101 may inquire whether the first application uses data. The first electronic device 101 may send an inquiry message including the identification information on the first application and an inquiry intent regarding the use of data to the second electronic device 102.

The second electronic device 102 may display a graphic user interface 1420 inquiring whether the first application uses data. The graphic user interface 1420 may include a message 1421 indicating that the first electronic device 101 requests to use data, a permit button 1422, and a reject button 1423.

In operation 1330, the second electronic device 102 may respond to whether to permit use of data. For example, when the permit button 1422 is selected, the second electronic device 102 may send a response of permitting the use of data. Otherwise, when the reject button 1423 is selected, the second electronic device 102 may send a response of rejecting the use of data.

In operation 1340, the first electronic device 101 may control the first application to use the data from the second electronic device 102 based on the permit response or reject response received from the second electronic device 102.

The first electronic device 101 may send a request to control the second electronic device 102. Accordingly, the second electronic device 102 may display a graphic user interface 1430 including a message 1431 that the first electronic device 101 desires use of the second electronic device 102, a permit button 1432, and a reject button 1433. When the permit button 1432 is selected, the second electronic device 102 may send a permit response to the first electronic device 101. In response to the permit button, the first electronic device 101 may permit the first application to use the second electronic device 102. When the reject button 1433 is selected, the second electronic device 102 may send a reject response to the first electronic device 101. In response to the reject button, the first electronic device 101 may not permit the first application to use the second electronic device 102.

As described above, whether the application uses the data from the second electronic device 102 or the second electronic device 102 may be determined by the second electronic device 102 as well as by the first electronic device 101.

Figure 15:
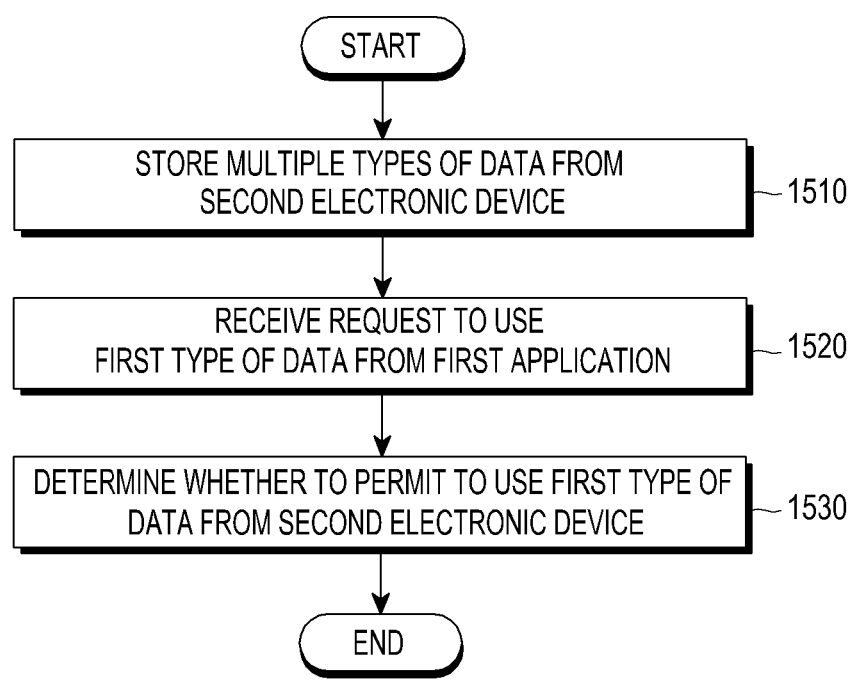
FIG. 15 is a flowchart illustrating a method for controlling an electronic device according to an embodiment of the present disclosure.

FIG. 15 is a flowchart illustrating a method for controlling an electronic device according to an embodiment of the present disclosure.

Referring to FIG. 15, in operation 1510, the first electronic device 101 may store a plurality of data types from the second electronic device 102. The second electronic device 102 may send the plurality of data types to the first electronic device 101. For example, the second electronic device 102, as a wrist watch-type electronic device, may sense electrocardiography (ECG) information on the user wearing the second electronic device 102 and movement information on the second electronic device 102. The second electronic device 102 may send the sensed ECG information and movement information to the first electronic device 101. The first electronic device 101 may previously store information indicating that the data types received from the second electronic device 102 are ECG information and movement information while connected with the second electronic device 102.

In operation 1520, the first electronic device 101 may receive a request for the first application to use a first type of data. For example, the first electronic device 101 may receive a request for the first application to use the ECG information.

In operation 1530, the first electronic device 101 may determine whether to permit to use the first type of data from the second electronic device 102. The first electronic device 101 may determine whether to permit based on at least one of a user input, a security level, and an application installation source. The first electronic device 101 may permit the first application to use the ECG information but not permit the first application to use the movement information. As described above, the first electronic device 101 may determine whether to use for each of a plurality of data types from a connected electronic device.

Figure 16:
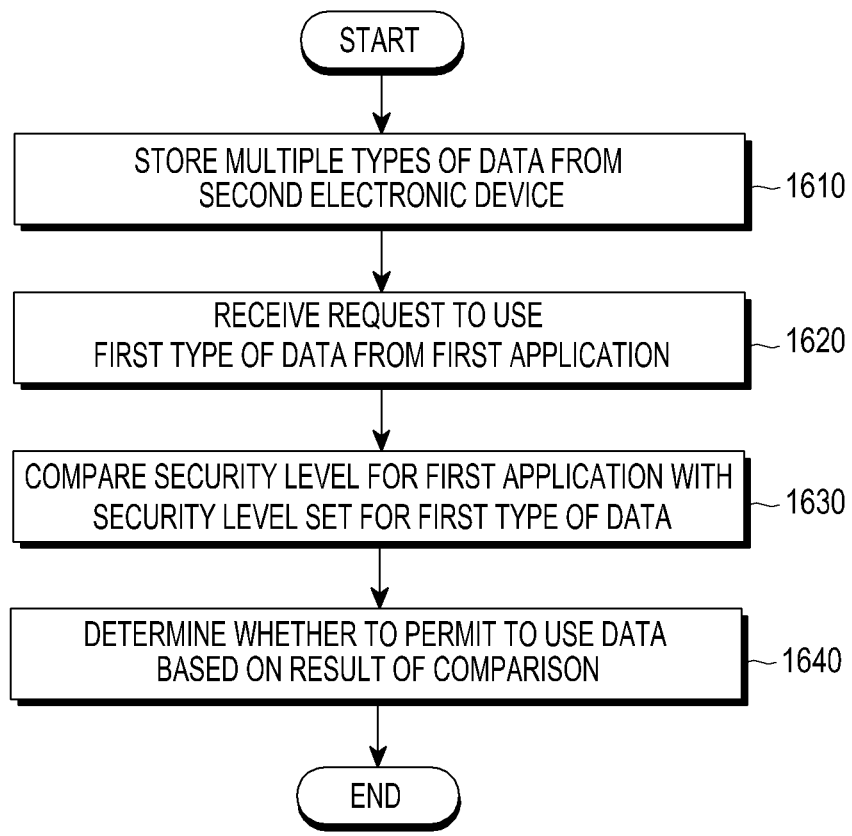
FIG. 16 is a flowchart illustrating a method for controlling an electronic device according to an embodiment of the present disclosure.
Figure 17A:
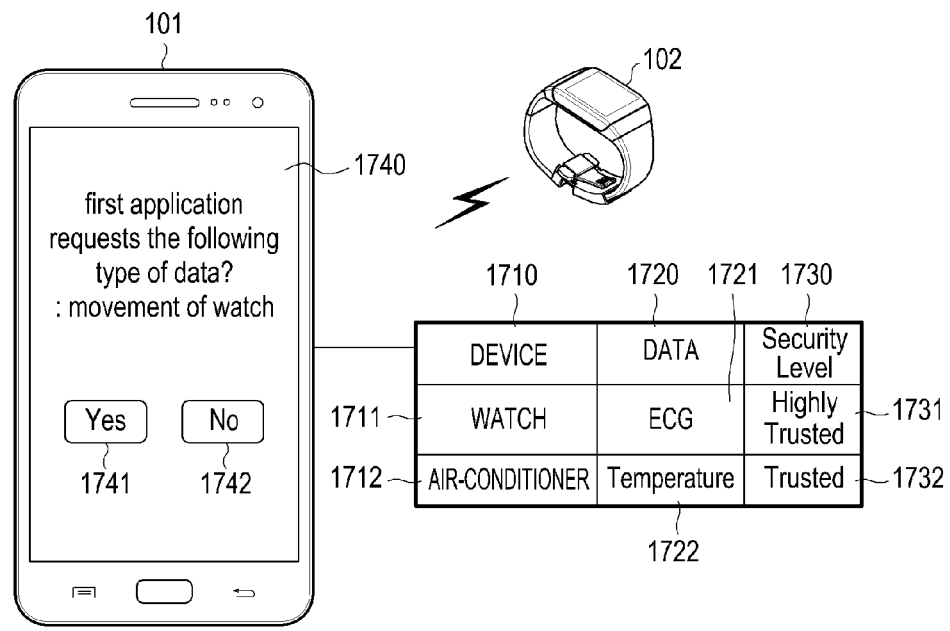
FIGS. 17A and 17B are views illustrating an electronic device according to an embodiment of the present disclosure.
Figure 17B:
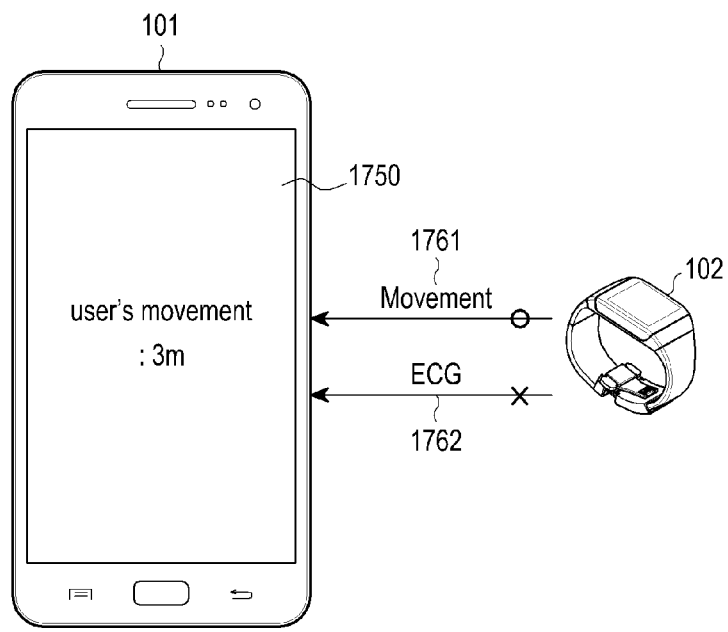

FIG. 16 is a flowchart illustrating a method for controlling an electronic device according to an embodiment of the present disclosure, and FIGS. 17A and 17B are views illustrating an electronic device according to an embodiment of the present disclosure.

Referring to FIGS. 16, 17A, and 17B, a flowchart of the method illustrated in FIG. 13 is described with reference to the views in FIGS. 14A and 14B.

In operation 1610, the first electronic device 101 may set security levels respectively for a plurality of types of data from the second electronic device 102. For example, the first electronic device 101 may store association information on a connected electronic device 1710, a data type 1720, and a security level 1730. The first electronic device 101 may store the association information that the type of data used by the wrist watch-type electronic device 1711 is ECG 1721 and the security level is a high level 1731. The first electronic device 101 may store the association information that the type of data used by the air-conditioner 1712 is temperature information 1722 and the security level is a normal level 1732.

In operation 1620, the first electronic device 101 may receive a request to use a first type of data from the first application. For example, the first electronic device 101 may request to use both the ECG and the temperature information.

In operation 1630, the first electronic device 101 may compare the security level for the first application with the security level set to the first type of data. For example, a normal (trusted) security level may be set for the first application. As described above, the security level for the first application may be set by the manufacturer, download server, or user. The first electronic device 101 may determine that the normal security level set for the first application is lower than the high security level corresponding to the ECG and is the same as the normal security level corresponding to the movement information.

In operation 1640, the first electronic device 101 may determine whether the first application uses data based on a result of the comparison. The first electronic device 101 may not permit to use the ECG information 1762 having a security level higher than the security level set to the first application. The first electronic device 101 may permit to use the movement information 1761 having the same security level as the security level set to the first application. The first electronic device 101 may display an application screen 1750 using the movement information 1761.

Meanwhile, a graphic user interface 1740 inquiring whether to permit use each data may be displayed to request whether to permit use the data depending on whether a permit button 1741 or reject button 1742 is selected.

Figure 18:
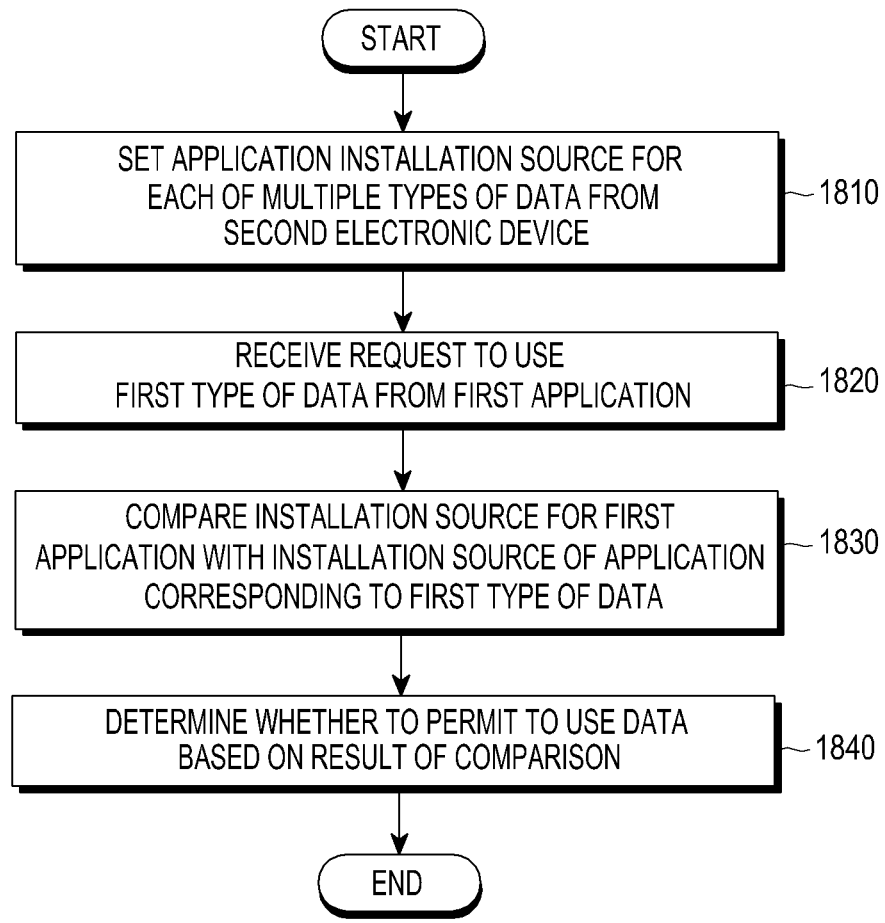
FIG. 18 is a flowchart illustrating a method for controlling an electronic device according to an embodiment of the present disclosure.

FIG. 18 is a flowchart illustrating a method for controlling an electronic device according to an embodiment of the present disclosure.

Referring to FIG. 18, in operation 1810, the first electronic device 101 may set an application installation source for each of a plurality of types of data from the second electronic device. The term application installation source may mean an application installation source that permits to use data. For example, the second electronic device 102 may be a wrist watch-type electronic device that may obtain and transmit ECG and movement information. The second electronic device 102 may set a market-level application installation source for the ECG information from the second electronic device 102 and may set a market-level and sideload-level application installation source for the movement information.

In operation 1820, the first electronic device 101 may receive a request for the first application to use a first type of data. For example, the first application may request to use both the ECG and movement information.

In operation 1830, the first electronic device 101 may compare the application installation source for the first application with the application installation route corresponding to the first type of data. In operation 1840, the first electronic device 101 may determine whether to permit use of data based on a result of the comparison. For example, the first application is assumed to be installed from a sideload source. The first electronic device 101 may determine that, for the movement information from the second electronic device 102, the application installation source is the same as the installation source for the first application. Thus, the first electronic device 101 may permit the first application to use the movement information. Meanwhile, the first electronic device 101 may determine that, for the ECG information from the second electronic device 102, the application installation source does not correspond to the installation source for the first application. Thus, the first electronic device 101 may not permit the first application to use the ECG information.

As described above, the electronic device may determine whether to permit use of data based on the application installation route permitted for each of a plurality of types of data of a connected electronic device.

Figure 19:
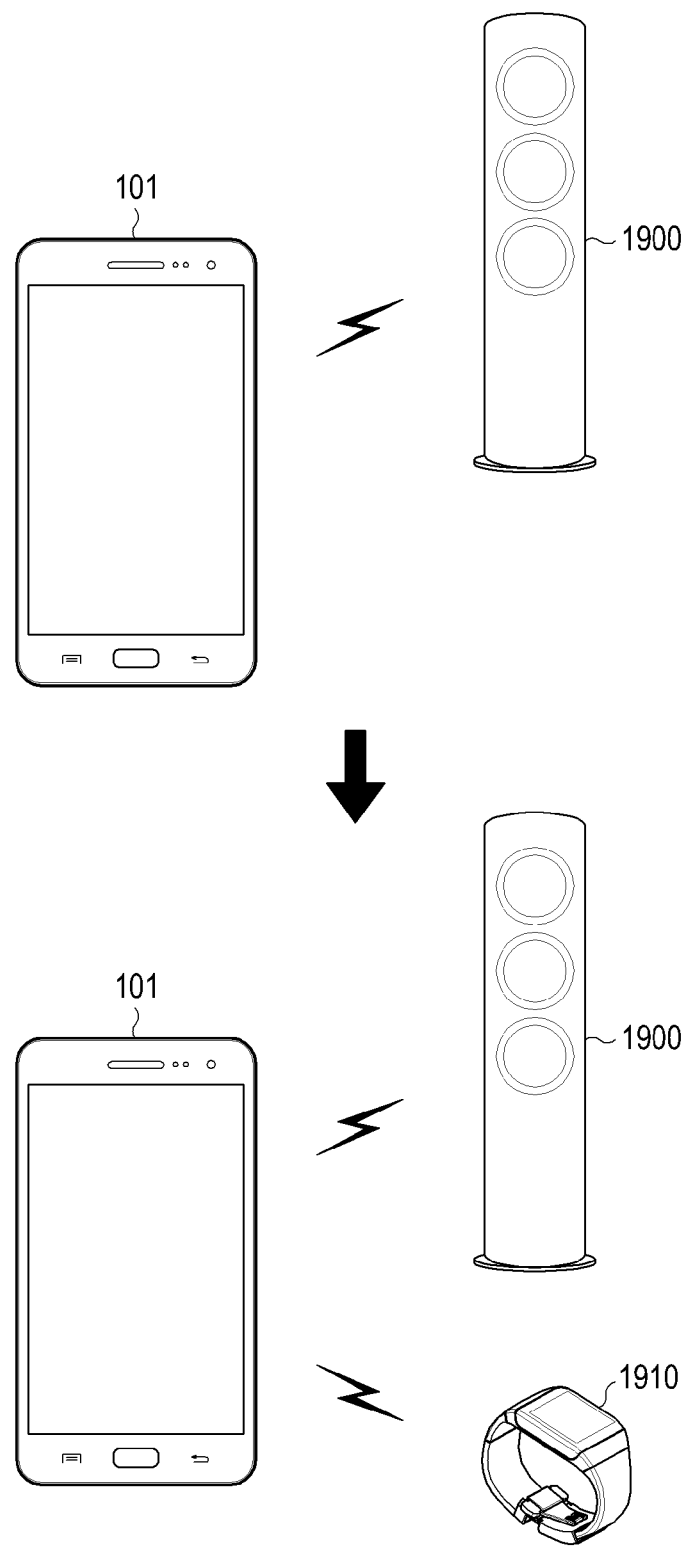
FIG. 19 is a view illustrating a connection between electronic devices according to an embodiment of the present disclosure.

FIG. 19 is a view illustrating a connection between electronic devices according to an embodiment of the present disclosure.

Referring to FIG. 19, the first electronic device 101 may be connected to a second electronic device 1900. Meanwhile, the first electronic device 101 may be additionally connected to a third electronic device 1910.

Figure 20:
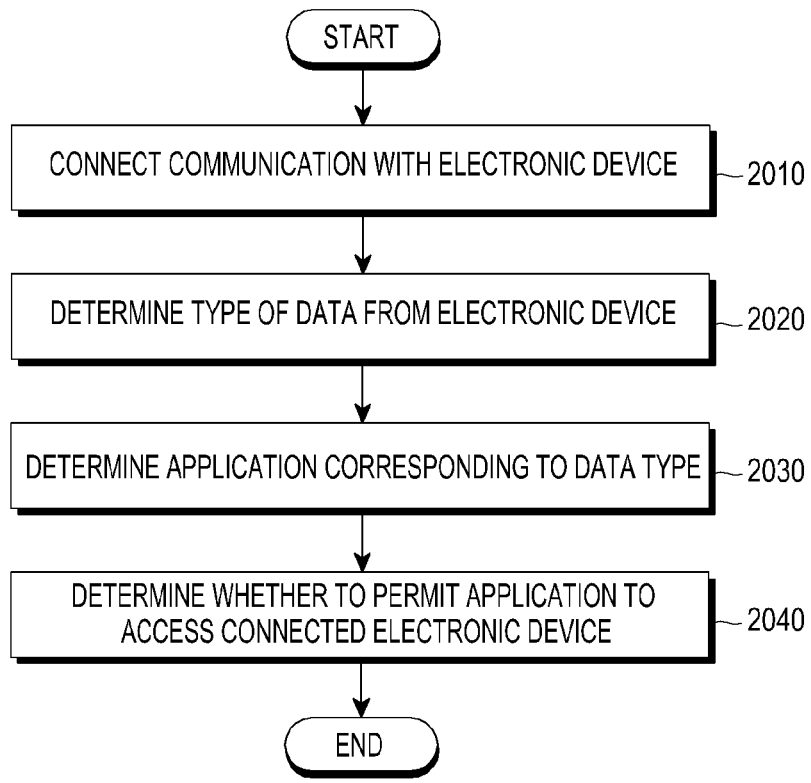
FIG. 20 is a flowchart illustrating a method for controlling an electronic device according to an embodiment of the present disclosure.

FIG. 20 is a flowchart illustrating a method for controlling an electronic device according to an embodiment of the present disclosure.

Referring to FIG. 20, the first electronic device 101 may be connected to an electronic device, e.g., the third electronic device 1910 in operation 2010.

In operation 2020, the first electronic device 101 may determine the type of data from the third electronic device 1910. For example, the third electronic device 1910 may be a wrist watch-type electronic device and may send the ECG to the first electronic device 101. The first electronic device 101 may determine that the type of data from the third electronic device 1910 is the ECG. The first electronic device 101 may determine the type of data during a pairing process or a discovery process with the third electronic device 1910.

In operation 2030, the first electronic device 101 may determine an application corresponding to the type of data from the third electronic device 1910. For example, the first electronic device 101 may determine a stored application using the ECG.

In operation 2040, the first electronic device 101 may determine whether to permit the application to access the third electronic device 1910. The first electronic device 101 may determine whether to permit the application to use the data from the third electronic device 1910 or to use the third electronic device 1910.

Figure 21:
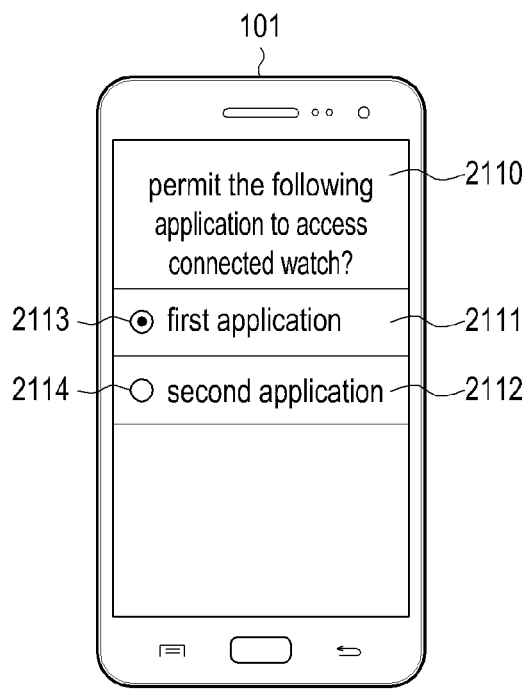
FIG. 21 is a view illustrating an electronic device according to an embodiment of the present disclosure.

FIG. 21 is a view illustrating an electronic device according to an embodiment of the present disclosure.

Referring to FIG. 21, the first electronic device 101 may display a graphic user interface 2110 to inquire whether to permit the first application 2111 and the second application 2112 determined as applications to use the ECG. The graphic user interface 2110 may include indication buttons 2113 and 2114 that may indicate whether to permit. In the embodiment of FIG. 21, it is assumed that the indication button 2113 corresponding to the first application 2111 is selected, and the indication button 2114 corresponding to the second application 2113 is not selected. The first electronic device 101 may permit the first application 2111 to use the ECG from the third electronic device 1910 newly connected but not the second application 2113. Meanwhile, the first electronic device 101 may determine whether to use data based on a security level or installation route set in the application.

Figure 22A:
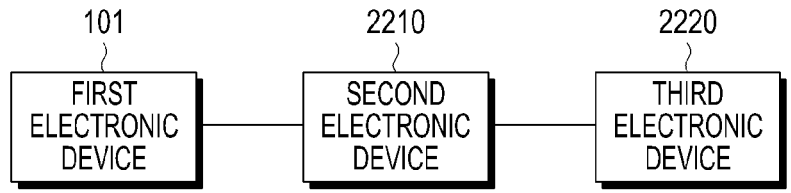
FIG. 22A is a view illustrating a connection between electronic devices according to an embodiment of the present disclosure.

FIG. 22A is a view illustrating a connection between electronic devices according to an embodiment of the present disclosure.

Referring to FIG. 22A, the first electronic device 101 may be connected with the second electronic device 2210. Meanwhile, the first electronic device 101 may also be connected with the third electronic device 2220. The first electronic device 101 may be connected with the third electronic device 2220 via relaying of the second electronic device 2210.

Figure 22B:
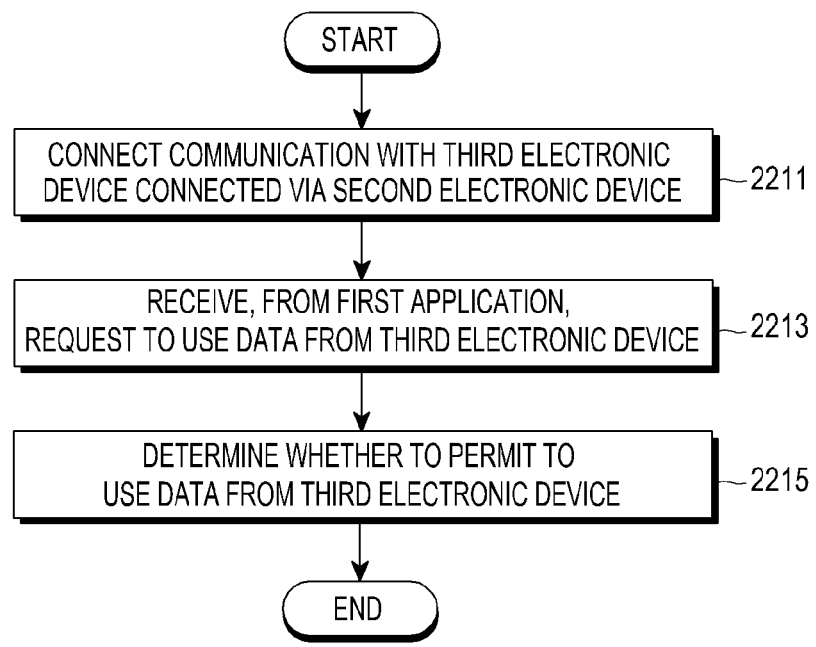
FIG. 22B is a flowchart of a method for controlling an electronic device according to an embodiment of the present disclosure.

FIG. 22B is a flowchart of a method for controlling an electronic device according to an embodiment of the present disclosure.

Referring to FIG. 22B, in operation 2211, the first electronic device 101 may be connected with the third electronic device 2220 via the second electronic device 2210.

In operation 2213, the first electronic device 101 may receive a request for the first application to use data from the third electronic device 2220. The first electronic device 101 may receive the request in a first application download process or first application running process.

In operation 2215, the first electronic device 101 may determine whether to permit to use data from the third electronic device 2220. For example, the first electronic device 101 may determine whether to permit the first application to use the data from the third electronic device 2220 based on at least one of a user input and a security level and application installation source. Or, the first electronic device 101 may determine whether to permit the first application to use the third electronic device 2220 based on at least one of a user input and a security level and application installation source.

A method for controlling a first electronic device communicating with a second electronic device may include connecting with the second electronic device, receiving a request for a first application to use data from the second electronic device, determining whether to permit to use the data from the second electronic device, and controlling the use by the first application of the data from the second electronic device based on the determination.

The determining of whether to permit to use the data from the second electronic device may include displaying a graphic user interface inquiring whether the first application is to use the data from the second electronic device, and determining whether to permit or reject the use of the data from the second electronic device based on a user input obtained from the graphic user interface.

The receiving of the request for the first application to use the data from the second electronic device may further include determining the second electronic device having a data type requested by the first application based on pre-stored association information for the second electronic device and a type of the data from the second electronic device.

The determining of whether to permit to use the data from the second electronic device may determine whether to permit or reject the use of the data from the second electronic device based on a security level for the first application.

The determining of whether to permit to use the data from the second electronic device may determine whether to permit to use the data from the second electronic device based on pre-stored association information of the second electronic device and an application security level permitted for the second electronic device.

The determining of whether to permit to use the data from the second electronic device may determine whether to permit or reject the use of the data from the second electronic device based on an installation route for the first application.

The determining of whether to permit to use the data from the second electronic device may include sending an inquiry regarding whether to permit to use the data to the second electronic device, and determining whether to permit to use the data from the second electronic device based on a response received from the second electronic device.

The control method may further comprise connecting to a third electronic document, determining a second application to use data from the third electronic document based on a type of the data from the third electronic document, and determining whether to permit the second application to use the data from the third electronic document to use the data from the third electronic document.

The control method may further comprise connecting to a third electronic device through the second electronic device, receiving a request to use data from the third electronic device from a first application, and determining whether to permit to use the data from the third electronic device.

The receiving of the request for the first application to use the data from the second electronic device may be performed in a process of installing the first application in the first electronic device.

The receiving of the request for the first application to use the data from the second electronic device may be performed in a process where the first application is run on the first electronic device.

The control method may further comprise, when permitted to use, transferring the data from the second electronic device to the first application or transferring data from the first application to the second electronic device.

The control method may further comprise receiving a declaration regarding a type of data to be used from the first application, and upon requesting data other than the data declared by the first application, abstaining from permitting to use the other data.

The second electronic device may output a first type of data and a second type of data, and receiving the request to use the data from the second electronic device from the first application may receive a request to use the first type of data.

The control method may further comprise, when permitted to use the first type of data, transferring the first type of data output from the second electronic device to the first application, and preventing the first application from accessing the second type of data not permitted to use.

A method for controlling a first electronic device communicating with a second electronic device may comprise, when installing a first application, identifying a type of first data used by the first application, identifying a type of second data input/output by the second electronic device, and when the type of the first data is the same as the type of the second data, determining whether to assign the first application a right to use the second electronic device.

A method for controlling a first electronic device communicating with a second electronic device may comprise connecting to the second electronic device, identifying a type of data output from the second electronic device and determining a first application stored in the first electronic device corresponding to the identified type of data; and determining whether to permit the first application to use data from the second electronic device.

A method for controlling a first electronic device may comprise connecting to a second electronic device and connecting to a third electronic device through the second electronic device, receiving a request to use data from the third electronic device from a first application, and determining whether to permit to use the data from the third electronic device.

A method for controlling a first electronic device communicating with a second electronic device may comprise connecting with the second electronic device, receiving a request for a first application to access a resource of the second electronic device, determining whether to access the resource of the second electronic device, and controlling the access by the first application to the resource of the second electronic device.

Figure 23:
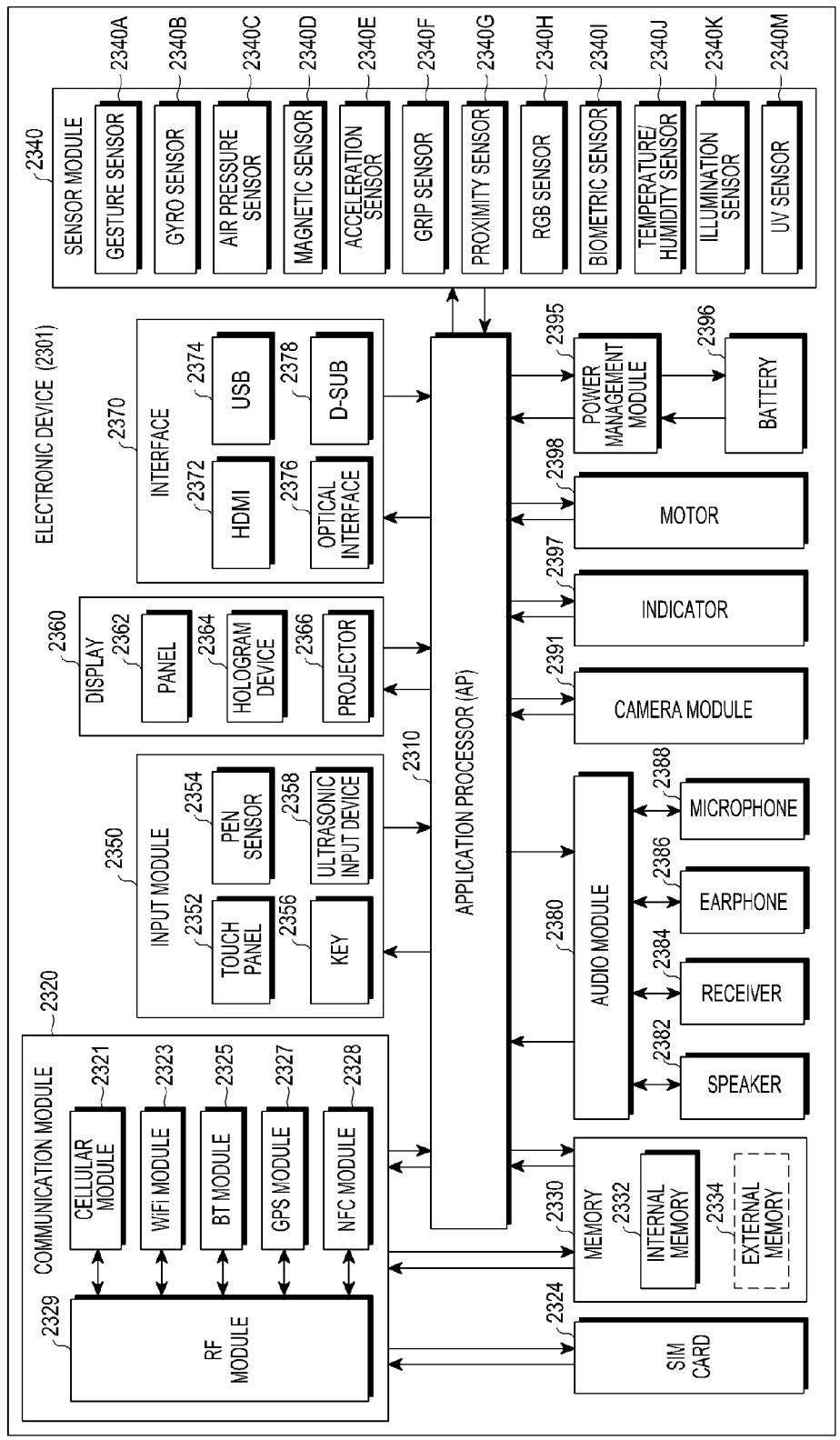
FIG. 23 is a block diagram of an electronic device according to an embodiment of the present disclosure.

FIG. 23 is a block diagram illustrating an electronic device according to an embodiment of the present disclosure.

Referring to FIG. 23, an electronic device 2301 may include the whole or part of the configuration of, e.g., the electronic device 101 shown in FIG. 1. For example, the electronic device 101 shown in FIG. 1 may include the whole or part of the electronic device 101 shown in FIG. 23. The electronic device 2301 may include one or more APs 2310, a communication module 2320, a subscriber identification module (SIM) card 2324, a memory 2330, a sensor module 2340, an input device 2350, a display 2360, an interface 2370, an audio module 2380, a camera module 2391, a power management module 2395, a battery 2396, an indicator 2397, and a motor 2398.

The AP 2310 may control multiple hardware and software components connected to the AP 2310 by running, e.g., an operating system or application programs, and the AP 2310 may process and compute various data. The AP 2310 may be implemented in, e.g., a system on chip (SoC). The AP 2310 may further include a graphics processing unit (GPU) and/or an image signal processor. The AP 2310 may include at least some (e.g., the cellular module 2321) of the components shown in FIG. 2. The AP 2310 may load a command or data received from at least one of other components (e.g., a non-volatile memory) on a volatile memory, process the command or data, and store various data in the non-volatile memory.

The communication module 2320 may have the same or similar configuration to the communication unit 170 of FIG. 1. The communication module 2320 may include, e.g., a cellular module 2321, a Wi-Fi module 2323, a BT module 2325, a GPS module 2327, an NFC module 2328, and a radio frequency (RF) module 2329.

The cellular module 2321 may provide voice call, video call, text, or Internet services through a communication network (e.g., an LTE, LTE-A, CDMA, WCDMA, UMTS, WiBro, or GSM network). The cellular module 2321 may perform identification or authentication on the electronic device 2301 in the communication network using an SIM (e.g., the SIM card 2324). The cellular module 2321 may perform at least some of the functions by the AP 2310. The cellular module 2321 may include a CP.

The Wi-Fi module 2323, the BT module 2325, the GPS module 2327, or the NFC module 2328 may include a process for, e.g., processing data communicated through the module. At least some (e.g., two or more) of the cellular module 2321, the Wi-Fi module 2323, the BT module 2325, the GPS module 2327, and the NFC module 2328 may be included in a single integrated circuit (IC) or an IC package.

The RF module 2329 may communicate, e.g., communication signals (e.g., RF signals). The RF module 2329 may include, e.g., a transceiver, a power amplifier module (PAM), a frequency filter, a low noise amplifier (LNA), or an antenna. At least one of the cellular module 2321, the Wi-Fi module 2323, the BT module 2325, the GPS module 2327, or the NFC module 2328 may communicate RF signals through a separate RF module.

The SIM card 2324 may include, e.g., a card including an SIM and/or an embedded SIM, and may contain unique identification information (e.g., an integrated circuit card identifier (ICCID) or subscriber information (e.g., an international mobile subscriber identity (IMSI)).

The memory 2330 (e.g., the memory 130) may include, e.g., an internal memory 2332 or an external memory 2334. The internal memory 2332 may include at least one of, e.g., a volatile memory (e.g., a dynamic random access memory (DRAM), a static RAM (SRAM), a synchronous DRAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 2334 may include a flash drive, e.g., a compact flash (CF) memory, a secure digital (SD) memory, a micro-SD memory, a min-SD memory, an extreme digital (xD) memory, or a memory stick. The external memory 2334 may be functionally and/or physically connected with the electronic device 2301 via various interfaces.

The sensor module 2340 may measure a physical quantity or detect an operational state of the electronic device 2301, and the sensor module 2340 may convert the measured or detected information into an electrical signal. The sensor module 2340 may include, e.g., a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor 2340H such as a red-green-blue (RGB) sensor, a bio sensor 2340I, a temperature/humidity sensor 2340J, an illumination sensor 2340K, or an ultra violet (UV) sensor 2340M. Additionally or alternatively, the sensing module 2340 may include, e.g., an E-nose sensor, an electromyography (EMG) sensor, an electroencephalogram (EEG) sensor, an electrocardiogram (ECG) sensor, an IR sensor, an iris sensor, or a finger print sensor. The sensor module 2340 may further include a control circuit for controlling at least one or more of the sensors included in the sensing module. The electronic device 2301 may further include a processor configured to control the sensor module 2340 as part of an AP 2310 or separately from the AP 2310, and the electronic device 2301 may control the sensor module 2340 while the AP is in a sleep mode.

The input unit 2350 may include, e.g., a touch panel 2352, a (digital) pen sensor 2354, a key 2356, or an ultrasonic input device 2358. The touch panel 2352 may use at least one of capacitive, resistive, IR, or ultrasonic methods. The touch panel 2352 may further include a control circuit. The touch panel 2352 may further include a tactile layer and may provide a user with a tactile reaction.

The (digital) pen sensor 2354 may include, e.g., a part of a touch panel or a separate sheet for recognition. The key 2356 may include e.g., a physical button, optical key or key pad. The ultrasonic input device 2358 may use an input tool that generates an ultrasonic signal and enable the electronic device 2301 to identify data by sensing the ultrasonic signal to a microphone (e.g., a microphone 2388).

The display 2360 (e.g., the display 160) may include a panel 2362, a hologram device 2364, or a projector 2366. The panel 2362 may have the same or similar configuration to the display 160 of FIG. 1. The panel 2362 may be implemented to be flexible, transparent, or wearable. The panel 2362 may also be incorporated with the touch panel 2352 in a module. The hologram device 2364 may make three dimensional (3D) images (holograms) in the air by using light interference. The projector 2366 may display an image by projecting light onto a screen. The screen may be, for example, located inside or outside of the electronic device 2301. In accordance with an embodiment of the present disclosure, the display 2360 may further include a control circuit to control the panel 2362, the hologram device 2364, or the projector 2366.

The interface 2370 may include e.g., an HDMI 2372, a USB 2374, an optical interface 2376, or a D-subminiature (D-sub) 2378. The interface 2370 may be included in e.g., the communication unit 170 shown in FIG. 1. Additionally or alternatively, the interface 2370 may include a mobile high-definition link (MHL) interface, an SD card/multimedia card (MMC) interface, or infrared data association (IrDA) standard interface.

The audio module 2380 may convert a sound into an electric signal or vice versa, for example. At least a part of the audio module 2380 may be included in e.g., the electronic device 101 as shown in FIG. 1. The audio module 2380 may process sound information input or output through e.g., a speaker 2382, a receiver 2384, an earphone 2386, or a microphone 2388.

The camera module 2391 may be a device for capturing still images and videos, and may include one or more image sensors (e.g., front and back sensors), a lens, an image signal processor (ISP), or a flash such as an LED or xenon lamp.

The power manager module 2395 may manage power of the electronic device 2301, for example. Although not shown, a power management IC (PMIC), a charger IC, or a battery or fuel gauge is included in the power manager module 2395. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 2396, a voltage, a current, or a temperature while the battery 2396 is being charged. The battery 2396 may include, e.g., a rechargeable battery or a solar battery. The indicator 2397 may indicate a particular state of the electronic device 2301 or a part of the electronic device (e.g., the AP 2310), including e.g., a booting state, a message state, or recharging state. The motor 2398 may convert an electric signal to a mechanical vibration and may generate a vibrational or haptic effect. Although not shown, a processing unit for supporting mobile TV, such as a GPU may be included in the electronic device 2301. The processing unit for supporting mobile TV may process media data conforming to a standard for digital multimedia broadcasting (DMB), digital video broadcasting (DVB), or mediaFLO™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific IC (ASIC) chips, field programmable gate arrays (FPGAs), or programmable logic arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

A storage medium may store commands. The commands may be configured to enable at least one processor to perform at least one operation when the commands are executed by the at least one processor. The at least one operation may include a method for controlling a first electronic device, including connecting to a second electronic device, receiving a request for a first application to use data from the second electronic device, determining whether to permit to use the data from the second electronic device, and controlling the use by the first application of the data from the second electronic device based on the determination.

As is apparent from the foregoing description, according to various embodiments of the present disclosure, there may be provided an electronic device and method for controlling the same that may set a right to use data received from other electronic device. According to various embodiments of the present disclosure, upon installation of an application, it may be determined whether to access the other electronic device connected with the electronic device via communication, thus leading to increased security. Further, while the application is running, it may be determined whether to access the other electronic device connected with the electronic device via communication, thus leading to increased security.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a first electronic device communicating with a second electronic device, the method comprising:
   connecting to the second electronic device;
   displaying a screen inquiring whether a first application executed by the first electronic device is permitted to use resource stored in the second electronic device, wherein the screen comprises at least one type of resource to be requested by the first application based on pre-stored association information for the second electronic device;
   receiving an input for permitting use of the resource stored in the second electronic device; and
   in response to the receiving of the input for permitting the use of the resource, transmitting a request for the resource to the second electronic device.

2. The method of claim 1, further comprising:
   determining whether to permit or reject the use of the resource based on a user input.

3. The method of claim 1, wherein the displaying the screen inquiring whether the first application is permitted to use the resource stored in the second electronic device further comprises determining if there is at least one type of resource associated with the second electronic device corresponding to the at least one type of resource requested by the first application based on the pre-stored association information for the second electronic device.

4. The method of claim 1, further comprises determining whether to permit the use of the resource based on a security level for the first application.

5. The method of claim 4, wherein the determining of whether to permit to use the resource comprises determining whether to permit to use the resource based on the pre-stored association information for the second electronic device and an application security level permitted for the second electronic device.

6. The method of claim 1, further comprising determining whether to permit the use of the resource based on an installation route for the first application.

7. The method of claim 1, further comprising:
   sending an inquiry regarding whether to permit to use the resource to the second electronic device; and
   determining whether to permit to use the resource based on a response received from the second electronic device.

8. The method of claim 1, further comprising:
   connecting to a third electronic device;
   determining a second application to use other resource stored in the third electronic device based on a type of the other resource; and
   determining whether to permit the second application to use the other resource.

9. The method of claim 1, further comprising:
   connecting to a third electronic device via relaying of the second electronic device;
   receiving a request to use other resource stored in the third electronic device from the first application; and
   determining whether to permit to use the other resource.

10. The method of claim 1, wherein the receiving of the input is performed during installing the first application in the first electronic device.

11. A first electronic device communicating with a second electronic device, the first electronic device comprising:
    a touch screen;
    a transceiver; and
    a processor configured to:
    connect to the second electronic device through the transceiver,
    control the touch screen to display a screen inquiring whether a first application executed by the first electronic device is permitted to use resource stored in the second electronic device, wherein the screen comprises at least one type of resource to be requested by the first application based on pre-stored association information for the second electronic device,
    receive an input for permitting use of the resource stored in the second electronic device from the touch screen, and
    in response to the receiving the input for permitting the use of the resource, transmitting a request for the resource to the second electronic device.

12. The first electronic device of claim 11,
    wherein the processor is further configured to determine whether to permit or reject the use of the resource based on a user input.

13. The first electronic device of claim 11, wherein the processor is further configured to determine if there is at least one type of resource associated with the second electronic device corresponding to the at least one type of resource requested by the first application based on the pre-stored association information for the second electronic device.

14. The first electronic device of claim 11, wherein the processor is further configured to determine whether to permit the use of the resource based on a security level for the first application.

15. The first electronic device of claim 11, wherein the processor is further configured to control the touch screen display the screen inquiring whether the first application is permitted to use resource when the first application is run on the first electronic device.

16. The first electronic device of claim 11, wherein the processor is further configured to:
    receive the resource from the second electronic device, and
    transfer the resource to the first application.

17. The first electronic device of claim 16, wherein the processor is further configured to:
- receive a message regarding a type of requested resource from the first application, and
- abstain from permitting to use other resource if the at least one type of resource to be requested by the first application is different from a type of resource.

18. The first electronic device of claim 11,
- wherein the resource comprises a first type of resource and a second type of resource, and
- wherein the processor is further configured to receive an input for permitting use of the first type of resource.

19. The first electronic device of claim 18, wherein the processor is further configured to, when the input for permitting use of the first type of resource is received:
- transfer, to the first application, the first type of resource received from the second electronic device, and
- prevent the first application from accessing the second type of resource.

20. A method for controlling a first electronic device communicating with a second electronic device, the method comprising:
- when installing a first application in the first electronic device, identifying a type of first resource to be requested by the first application;
- identifying a type of second resource associated with the second electronic device based on pre-stored association information for the second electronic device in a memory of the first electronic device; and
- when the type of the first resource is the same as the type of the second resource, determining whether to assign the first application access to use resource corresponding to the type of the second resource stored in the second electronic device.

* * * * *